United States Patent
Liu et al.

(10) Patent No.: US 10,027,413 B2
(45) Date of Patent: Jul. 17, 2018

(54) CASCADED WAVEFORM MODULATION WITH AN EMBEDDED CONTROL SIGNAL FOR HIGH-PERFORMANCE MOBILE FRONTHAUL

(71) Applicant: Futurewei Technologies, Inc., Plano, TX (US)

(72) Inventors: Xiang Liu, Marlboro, NJ (US); Huaiyu Zeng, Red Bank, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/179,526

(22) Filed: Jun. 10, 2016

(65) Prior Publication Data

US 2016/0373208 A1 Dec. 22, 2016

Related U.S. Application Data

(60) Provisional application No. 62/181,563, filed on Jun. 18, 2015.

(51) Int. Cl.
*H04B 10/25* (2013.01)
*H04B 10/54* (2013.01)
(Continued)

(52) U.S. Cl.
CPC ........ *H04B 10/25* (2013.01); *H04B 10/541* (2013.01); *H04B 10/5561* (2013.01); *H04B 10/60* (2013.01)

(58) Field of Classification Search
CPC .... H04B 7/212; H04B 7/2618; H04B 7/2643; H04B 7/2646; H04B 7/2659; H04B 10/25;
(Continued)

(56) References Cited

U.S. PATENT DOCUMENTS

| 3,319,139 A | 5/1967 | Rueffer |
| 3,675,754 A | 7/1972 | Villemaud |

(Continued)

FOREIGN PATENT DOCUMENTS

| CN | 1457205 A | 11/2003 |
| CN | 1619969 A | 5/2005 |

(Continued)

OTHER PUBLICATIONS

"Common Public Radio Interface (CPRI); Interface Specification," CPRI Specification V6.1, Jul. 1, 2014, 129 pages.

(Continued)

*Primary Examiner* — Young T Tse
(74) *Attorney, Agent, or Firm* — Conley Rose, P.C.

(57) ABSTRACT

A method implemented in a communication device, comprising generating, via a processor of the communication device, a first waveform modulation signal based on a first approximation of an input signal, generating, via the processor, a second waveform modulation signal based on a first difference between the input signal S and the first waveform modulation signal, generating, via the processor, a control signal having a sequence of control symbols with a predetermined modulation format, performing, via the processor, time-domain multiplexing (TDM) on the first waveform modulation signal, the second waveform modulation signal, and the control signal to form a cascaded waveform modulation signal with embedded control signal (CWM-CS), modulating, via a frontend of the communication device, the CWM-CS onto a carrier, and transmitting, via the frontend, the CWM-CS over a communication link to a corresponding communication device in a network.

26 Claims, 13 Drawing Sheets

(51) Int. Cl.
*H04B 10/556* (2013.01)
*H04B 10/60* (2013.01)

(58) Field of Classification Search
CPC ............ H04B 10/2075; H04B 10/2581; H04B 10/50; H04B 10/50577; H04B 10/50597; H04B 10/541; H04B 10/5561; H04B 10/60; H04L 27/20; H04L 27/36; H04L 27/362; H04L 27/364; H04L 27/366; H04J 14/0223; H04J 14/0298; H04J 14/08
USPC ....... 375/259–261, 265, 267, 279, 281, 284, 375/295–299, 308; 332/103, 144, 145; 370/208, 210, 335, 337, 342, 344, 347
See application file for complete search history.

(56) References Cited

U.S. PATENT DOCUMENTS

| | | | |
|---|---|---|---|
| 3,991,273 | A | 11/1976 | Bell et al. |
| 7,382,805 | B1 | 6/2008 | Raza et al. |
| 7,813,271 | B2 | 10/2010 | Fourcand |
| 8,675,754 | B1 | 3/2014 | Yonge, III et al. |
| 9,319,139 | B2 | 4/2016 | Effenberger et al. |
| 9,716,573 | B2 | 7/2017 | Liu et al. |
| 9,755,779 | B2 | 9/2017 | Zeng et al. |
| 2004/0153942 | A1 | 8/2004 | Shtutman et al. |
| 2004/0246891 | A1 | 12/2004 | Kay et al. |
| 2005/0068918 | A1* | 3/2005 | Mantravadi .......... H04B 7/0669 370/328 |
| 2005/0163071 | A1 | 7/2005 | Malladi et al. |
| 2006/0262871 | A1 | 11/2006 | Cho et al. |
| 2007/0030116 | A1* | 2/2007 | Feher .................... H04M 3/382 340/5.53 |
| 2007/0116046 | A1 | 5/2007 | Liu et al. |
| 2008/0225816 | A1 | 9/2008 | Osterling et al. |
| 2009/0073922 | A1 | 3/2009 | Malladi et al. |
| 2010/0086051 | A1 | 4/2010 | Park et al. |
| 2010/0103901 | A1 | 4/2010 | Miki et al. |
| 2010/0195583 | A1 | 8/2010 | Nory et al. |
| 2010/0195624 | A1 | 8/2010 | Zhang et al. |
| 2011/0032910 | A1 | 2/2011 | Aarflot et al. |
| 2012/0044927 | A1 | 2/2012 | Pan et al. |
| 2012/0057572 | A1 | 3/2012 | Evans et al. |
| 2012/0114134 | A1 | 5/2012 | Li et al. |
| 2012/0177372 | A1 | 7/2012 | Liu et al. |
| 2012/0213095 | A1 | 8/2012 | Krishnamurthy et al. |
| 2012/0219085 | A1 | 8/2012 | Long et al. |
| 2012/0257896 | A1 | 10/2012 | Djordjevic et al. |
| 2013/0163524 | A1 | 6/2013 | Shatzkamer et al. |
| 2013/0294253 | A1 | 11/2013 | Leroudier |
| 2013/0329633 | A1 | 12/2013 | Dalela et al. |
| 2014/0064214 | A1 | 3/2014 | Papasakellariou et al. |
| 2014/0161447 | A1 | 6/2014 | Graves et al. |
| 2014/0192796 | A1 | 7/2014 | Zhang |
| 2014/0255034 | A1* | 9/2014 | Huo ................... H04Q 11/0067 398/82 |
| 2014/0269639 | A1 | 9/2014 | Heo et al. |
| 2014/0270759 | A1 | 9/2014 | Djordjevic et al. |
| 2014/0328601 | A1 | 11/2014 | Cavaliere |
| 2014/0334305 | A1 | 11/2014 | Leroudier |
| 2015/0036556 | A1 | 2/2015 | Imamura et al. |
| 2015/0071641 | A1 | 3/2015 | Wen et al. |
| 2015/0162970 | A1 | 6/2015 | Kamalizad et al. |
| 2015/0207740 | A1 | 7/2015 | Jamond et al. |
| 2015/0280826 | A1 | 10/2015 | Effenberger et al. |
| 2015/0326422 | A1 | 11/2015 | Sagong et al. |
| 2015/0333865 | A1* | 11/2015 | Yu ...................... H04B 10/5161 398/44 |
| 2015/0365934 | A1 | 12/2015 | Liu et al. |
| 2016/0065325 | A1 | 3/2016 | Cavaliere et al. |
| 2016/0204873 | A1 | 7/2016 | Perez De Aranda Alonso et al. |
| 2016/0308641 | A1 | 10/2016 | Zeng et al. |
| 2017/0331581 | A1 | 11/2017 | Zeng et al. |

FOREIGN PATENT DOCUMENTS

| | | |
|---|---|---|
| CN | 1694390 A | 11/2005 |
| CN | 1812292 A | 8/2006 |
| CN | 102572967 A | 7/2012 |
| CN | 103401613 A | 11/2013 |
| CN | 103441799 A | 12/2013 |
| WO | 9613923 A1 | 5/1996 |
| WO | 2009020983 A1 | 2/2009 |
| WO | 2014076004 A2 | 5/2015 |

OTHER PUBLICATIONS

"Common Public Radio Interface (CPRI); Interface Specification," CPRI Specification V4.1, Feb. 18, 2009, 109 pages.

Liu, C., et al., "A Novel Multi-Service Small-Cell Cloud Radio Access Network for Mobile Backhaul and Computing Based on Radio-Over-Fiber Technologies," Journal of Lightwave Technology, vol. 31, No. 17, Sep. 1, 2013, pp. 2869-2875.

Qualcom Incorporated, "On channel bandwidth and Inter-band CA," R2-120282, 3 pages.

Sundaresan, K., et al., "FluidNet: A Flexible Cloud-based Radio Access Network for Small Cells," XP55256070, Proceedings of the 19th Annual International Conference on Mobile Computing and Networking, Sep. 30-Oct. 4, 2013, 12 pages.

Liu, X., et al., "Multiband DFT-Spread-OFDM Equalizer with Overlap-and-Add Dispersion Compensation for Low-Overhead and Low-Complexity Channel Equalization," XP055374371, Optical Fiber Communication Conference, National Fiber Optic Engineers Conference, Mar. 17, 2013, 3 pages.

Foreign Communication From a Counterpart Application, PCT Application No. PCT/CN2016/079297, English Translation of International Search Report dated Jul. 7, 2016, 7 pages.

Foreign Communication From a Counterpart Application, PCT Application No. PCT/CN2016/079297, English Translation of Written Opinion dated Jul. 7, 2016, 3 pages.

Foreign Communication From a Counterpart Application, PCT Application No. PCT/CN2015/081279, English Translation of International Search Report dated Sep. 21, 2015, 7 pages.

Foreign Communication From a Counterpart Application, PCT Application No. PCT/CN2015/081279, English Translation of Written Opinion dated Sep. 21, 2015, 4 pages.

Foreign Communication From a Counterpart Application, European Application No. 15806670.4, Extended European Search Report dated May 29, 2017, 8 pages.

Office Action dated Dec. 1, 2017, 18 pages, U.S. Appl. No. 15/665,094, filed Jul. 31, 2017.

Office Action dated Oct. 6, 2016, 25 pages, U.S. Appl. No. 14/853,478, filed Sep. 14, 2015.

Notice of Allowance dated May 3, 2017, 13 pages, U.S. Appl. No. 14/853,478, filed Sep. 14, 2015.

Office Action dated Jun. 15, 2016, 25 pages, U.S. Appl. No. 14/528,823, filed Oct. 30, 2014.

Office Action dated Oct. 13, 2016, 19 pages, U.S. Appl. No. 14/528,823, filed Oct. 30, 2014.

Office Action dated Mar. 17, 2017, 9 pages, U.S. Appl. No. 14/528,823, filed Oct. 30, 2014.

Liu, et al., "Aggregated Touchless Wireless Fronthaul," U.S. Appl. No. 14/528,823, filed Mar. 20, 2015, Specification 48 pages with 26 pages of drawings.

U.S. Appl. No. 14/853,478, 39 pages, filed Sep. 14, 2015, "Digital Representations of Analog Signals and Control Words Using Different Multi-Level Modulation Formats."

Foreign Communication From a Counterpart Application, PCT Application No. PCT/CN2016/085752, English Translation of International Search Report dated Aug. 29, 2016, 7 pages.

Foreign Communication From a Counterpart Application, PCT Application No. PCT/CN2016/085752, English Translation of Written Opinion dated Aug. 29, 2016, 4 pages.

Foreign Communication From a Counterpart Application, European Application No. 16779606.9, Extended European Search Report dated Apr. 5, 2018, 8 pages.

(56) References Cited

OTHER PUBLICATIONS

Foreign Communication From a Counterpart Application, European Application No. 16810987.4, Extended European Search Report dated May 9, 2018, 7 pages.

* cited by examiner

CASCADED WAVEFORM MODULATION WITH AN EMBEDDED CONTROL SIGNAL FOR HIGH-PERFORMANCE MOBILE FRONTHAUL

CROSS-REFERENCE TO RELATED APPLICATIONS

The present application claims priority to U.S. Provisional Patent Application 62/181,563, filed Jun. 18, 2015 by Xiang Liu and Huaiyu Zeng, and entitled "Cascaded Waveform Modulation with an Embedded Control Signal for High-Performance Mobile Fronthaul," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio access network (RAN) refers to a network between mobile devices and a core network. In traditional wireless macro-cell networks, an area may be geographically divided into a plurality of cells and cell sectors, each served by a wireless base station communicating with a core network. The part of the RAN between the wireless base stations and the core network is referred to as the wireless backhaul. As the demand for high-speed wireless communications continues to increase, reaching the limits of macro cells in terms of the number of locations and penetration capability in indoor or densely-populated areas, research and industry are moving towards small-cell deployments with denser and smaller cells.

Wireless fronthaul and mobile fronthaul are emerging network segments that enable a centralized-RAN (C-RAN) architecture suitable for small-cell deployments. In a C-RAN architecture, the digital baseband (BB) processing that is typically performed at wireless base stations located at remote cell sites is relocated to centralized baseband units (BBUs) located at a central office (CO) or nearby a core network. As such, the wireless base stations located at remote cell sites are replaced by remote radio units (RRUs) that interface with antennas for wireless radio frequency (RF) transmissions and receptions with no or limited digital BB processing. Wireless fronthaul refers to the part of the RAN between the RRUs and the BBUs. By relocating the digital BB processing to the centralized BBUs, the C-RAN architecture may enable resource sharing and coordinated multipoint (CoMP) processing, such as joint signal processing, joint interference mitigation, and/or joint scheduling among multiple antennas in cells, thus improving network performance and efficiency. The C-RAN architecture may also support massive multiple-input multiple output (MIMO) for high-throughput wireless transmission.

Wireless fronthaul may be enabled by optical fiber communication technologies, where optical fiber links may be employed for transporting signals and/or data between the RRUs located at the remote cell sites and the BBUs located at the central site. Some advantages of optical fiber transmissions may include low power loss, low latency, and high bandwidths (BWs). However, the employments of optical fibers and optical hardware add cost to the wireless fronthaul network. Thus, efficient usage of optical fiber links and optical hardware may be important in wireless fronthaul design.

SUMMARY

One approach to supporting C-RAN is to encode digital in-phase and quadrature-phase (IQ) samples of wireless channel signals according to a common public radio interface (CPRI) protocol as defined in CPRI specification V6.1, 2014, which uses binary modulation, and transport CPRI encoded-frames over an optical fiber link between a RRU and a BBU. Another approach is based on an analog waveform modulation technique, which is referred to as the efficient mobile fronthaul (EMF) approach. The EMF approach aggregates multiple wireless channel signals into one single wavelength channel using frequency-domain aggregation or time-domain aggregation. The EMF approach has higher bandwidth efficiency, lower digital signal processing (DSP) complexity, and lower processing latency than the CPRI approach, but suffers from greater error-vector magnitudes (EVMs). To resolve these and other problems, and as will be more fully explained herein, a cascaded waveform modulation (CWM) technique is used to separately modulate an aggregated wireless channel signal at multiple different resolutions to improve signal-to-noise ratios (SNRs). In addition, control signals may be embedded with CWM modulated signals for transmission over an optical fiber link to assist channel equalization.

In one embodiment, the disclosure includes a method implemented in a communication device, comprising generating, via a processor of the communication device, a first waveform modulation signal, denoted as $W_1$, based on a first approximation of an input signal, denoted as S, generating, via the processor, a second waveform modulation signal, denoted as $W_2$, based on a first difference between the input signal S and the first waveform modulation signal $W_1$, generating, via the processor, a control signal, denoted as CS, having a sequence of control symbols with a predetermined modulation format, performing, via the processor, time-domain multiplexing (TDM) on the first waveform modulation signal $W_1$, the second waveform modulation signal $W_2$, and the control signal CS to form a cascaded waveform modulation signal with embedded control signal (CWM-CS), modulating, via a frontend of the communication device, the CWM-CS onto a carrier, and transmitting, via the frontend, the CWM-CS over a communication link to a corresponding communication device in a network. In some embodiments, the disclosure also includes generating the first waveform modulation signal $W_1$ comprises approximating the input signal S as follows:

$$W_1 = round\left(\frac{S}{E_{max}} \times M\right) \times \frac{E_{max}}{M},$$

where round( ) is a rounding function that rounds an input value to a nearest integer, $E_{max}$ is related to a maximal amplitude of the input signal S, and M is a positive integer, and/or wherein the input signal S is a complex-valued signal comprising a real component and an imaginary component, and wherein $E_{max}$ is associated with a first maximum value of the real component or a second maximum value of the imaginary component, and/or wherein M is a positive integer between 4 and 8, and/or wherein the first waveform modulation signal $W_1$ is generated such that the first waveform modulation signal $W_1$ comprises $(2M+1)^2$ distinct complex signal values based on a SNR of the communication link, and/or further comprising selecting, via the processor, a value for M based on a link SNR of the communication link, and/or wherein the input signal S comprises an in-phase (I) component and a quadrature-phase (Q) component, wherein the I component is represented by first N bits, denoted as $i_n$ for $1 \leq n \leq N$, as follows:

$$S_I = real(S) = a \sum_{n=1}^{N} 2^{n-1} \left( i_n - \frac{1}{2} \right),$$

and wherein the Q component is represented by second N bits, denoted as $q_n$ for $1 \leq n \leq N$, as follows:

$$S_Q = imag(S) = b \sum_{n=1}^{N} 2^{n-1} \left( q_n - \frac{1}{2} \right)$$

where real(S) represents a real component of the input signal S, imag(S) represents an imaginary component of the input signal S, and a and b are two quantities related to sampling resolutions of the I component and the Q component, respectively, and/or wherein the input signal S comprises a digital representation of a CPRI signal, and/or wherein generating the first waveform modulation signal $W_1$ comprises obtaining m most significant bits (MSBs) for each of the I component and the Q component as follows:

$$W_1 = a \sum_{n=N-m+1}^{N} 2^{n-1} \left( i_n - \frac{1}{2} \right) + jb \sum_{n=N-m+1}^{N} 2^{n-1} \left( q_n - \frac{1}{2} \right)$$

where j is an imaginary unit, and/or wherein the predetermined modulation format is a quadrature-amplitude modulation (QAM) format, and/or further comprising selecting 16-quadrature-amplitude modulation (16-QAM) as the QAM format when a SNR of the control signal CS is between 23 decibel (dB) to 29 dB, and/or further comprising selecting 64-quadrature-amplitude modulation (64-QAM) as the QAM format when a SNR of the control signal CS is greater than 29 decibel (dB), and/or scaling, via the processor, the first waveform modulation signal $W_1$ by a first factor, denoted as $c_1$, prior to performing the TDM, scaling, via the processor, the second waveform modulation signal $W_2$ by a second factor, denoted as $c_2$, prior to performing the TDM, scaling, via the processor, the control signal by a third factor, denoted as $c_3$, prior to performing the TDM, and selecting, via the processor, the first factor $c_1$, the second factor $c_2$, and the third factor $c_3$ such that maximal amplitudes of $c_1 \times W_1$, $c_2 \times W_2$, and $c_3 \times CS$ are similar, and/or wherein the input signal S comprises an orthogonal frequency-division multiplexing (OFDM) signal, a filtered OFDM signal, a multi-band OFDM signal, a discrete Fourier transform (DFT)-spread OFDM signal, a filter-band multi-carrier (FBMC) signal, a universal filtered multi-carrier (UFMC) signal, or combinations thereof, and/or further comprising performing upsampling on the CWM-CS prior to modulating the CWM-CS, and/or further comprising performing pulse shaping (PS) on the CWM-CS prior to modulating the CWM-CS, and/or further comprising performing frequency up-conversion on the CWM-CS to produce a frequency up-converted CWM-CS prior to modulating the CWM-CS, and/or wherein modulating the CWM-CS comprises modulating a real component of the frequency up-converted CWM-CS, and/or wherein the real component of the frequency up-converted CWM-CS is modulated via an optical intensity modulation (IM) with a suitable bias, and/or wherein the control signal CS comprises control words for network control and management purpose, and/or wherein the control signal CS comprises training symbols for channel synchronization purpose, and/or further comprising generating the second waveform modulation signal $W_2$ further by applying a second approximation to the first difference between the input signal S and the first waveform modulation signal $W_1$, generating a third waveform modulation signal, denoted as $W_3$, based on a second difference between the input signal S and a sum of the first waveform modulation signal $W_1$ and the second waveform modulation signal $W_2$, and performing the TDM further on the CWM-CS and the third waveform modulation signal $W_3$, and/or wherein the communication link comprises an optical fiber link, a cable link, a digital subscriber line (DSL) link, or a free-space microwave link.

In another embodiment, the disclosure includes a method implemented in a communication device, comprising receiving, via a frontend of the communication device from a communication link, a CWM-CS, performing, via a processor of the communication device, time-domain demultiplexing on the CWM-CS to obtain a first waveform modulation signal, denoted as $W_1$, a second waveform modulation signal, denoted as $W_2$, and a control signal, denoted as CS, training, via the processor, a channel equalizer based on the control signal CS, performing, via the processor, channel equalization on the first waveform modulation signal $W_1$, the second waveform modulation signal $W_2$, and a control signal CS, performing, via the processor, time-domain de-multiplexing on the first waveform modulation signal $W_1$, the second waveform modulation signal $W_2$, and a control signal CS, applying, via the processor, a rounding function to the first waveform modulation signal $W_1$, generating, via the processor, a recovered signal, denoted as S, by summing the first waveform modulation signal $W_1$ and the second waveform modulation signal $W_2$, recovering, via the processor, data from the recovered signal S, and recovering, via the processor, control information by demodulating the control signal CS, and/or further comprising dividing, via the processor, the first waveform modulation signal $W_1$ by a first factor, denoted as $c_1$, prior to generating the recovered signal S, dividing, via the processor, the second waveform modulation signal $W_2$ by a second factor, denoted as $c_2$, prior to generating the recovered signal S, and dividing, via the processor, the control signal CS by a third factor, denoted as $c_3$, prior to recovering the control information, and/or further comprising performing frequency down-conversion on the CWM-CS received from the communication link, and/or further comprising performing pulse shaping on the CWM-CS received from the communication link, and/or further comprising performing down-sampling on the CWM-CS received from the communication link.

In yet another embodiment, the disclosure includes a communication device comprising a processor configured to generate a first waveform modulation signal, denoted as $W_1$, based on a first approximation of an input signal, denoted as S, generate a second waveform modulation signal, denoted as $W_2$ based on a difference between the input signal S and the first waveform modulation signal $W_1$, perform TDM on the first waveform modulation signal $W_1$ and the second waveform modulation signal $W_2$ to form a cascaded waveform modulation (CWM) signal, and generate an output signal according to the first waveform modulation signal $W_1$ and the second waveform modulation signal $W_2$, and a frontend coupled to the processor and configured to transmit the output signal over a communication link to a corresponding communication device in a network. In some embodiments, the disclosure also includes wherein the processor is further configured to generate the first waveform modulation signal by dividing the input signal by a first scale factor associated with a maximum signal amplitude of the input signal to produce a first signal, multiplying the first signal by a second scale factor associated with a SNR of the communication link, applying a rounding function to the first signal, multiplying the first signal by the first scale factor, and dividing the first signal by the second scale factor, and/or wherein the processor is further configured to generate a control signal, denoted as CS, comprising a sequence of control symbols of a modulation format, perform the TDM further on the control signal and the CWM signal to produce a CWM-CS, and scale signal levels of the first waveform modulation signal $W_1$, the second waveform modulation signal $W_2$, and the control signal CS such that maximal amplitudes of the first waveform modulation signal $W_1$, the second waveform modulation signal $W_2$, and the control signal CS are similar, and wherein the frontend is further configured to modulate the output signal onto a carrier prior to transmitting the output signal.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
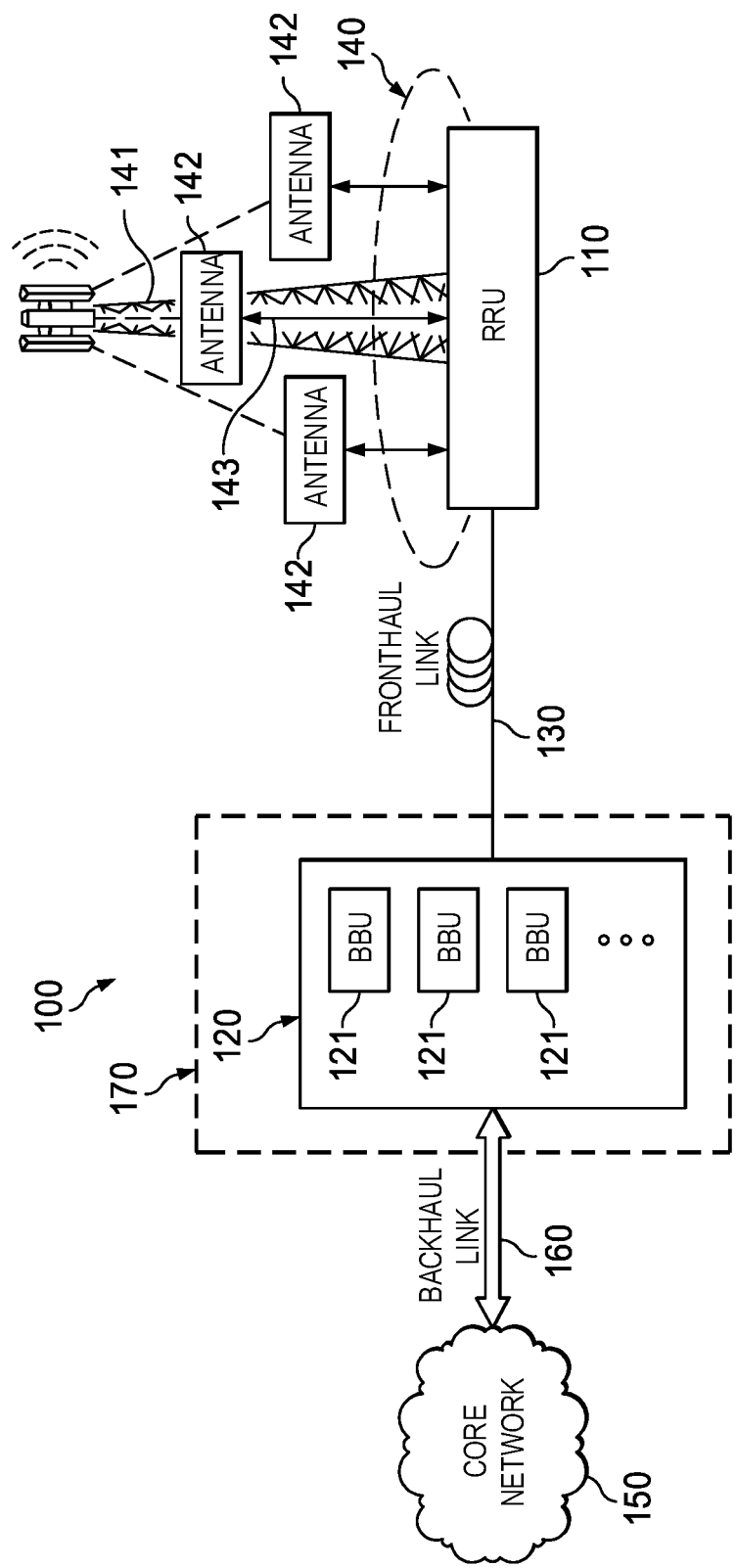
FIG. 1 is a schematic diagram of a C-RAN system.

FIG. 1 is a schematic diagram of a C-RAN system 100. The system 100 comprises an RRU 110 communicatively coupled to a BBU pool 120 through a fronthaul link 130. The RRU 110 is located at a remote cell site 140. The RRU 110 is typically installed at the bottom of a cell tower 141 that holds a plurality of antennas 142. The fronthaul link 130 may be a cable link, a free-space microwave link, a DSL link, or an optical fiber link configured to transport digital baseband signals between the RRU 110 and the BBU pool 120. A cable link in some examples comprises coaxial cables. A free-space microwave link comprises a line-of-sight radio wave propagation path. A DSL link comprises DSLs, which are twisted copper pairs. An optical fiber link comprises a standard single-mode fiber (SSMF) or a multi-mode fiber (MMF). Since optical fibers provide significantly lower power loss, higher speed, and higher BW than cables, optical fibers are commonly employed for the fronthaul link 130 instead of cables. The BBU pool 120 is typically located at a CO site 170. The cell site 140 is a geographical area located at a remote location away from the CO site 170 and may comprise one or more cell sectors, which may be determined during network deployment by mobile operators. The RRU 110 serves a plurality of mobile stations located in the cell site 140. The BBU pool 120 connects the RRU 110 to a core network 150 via a backhaul link 160. The backhaul link 160 is substantially similar to the fronthaul link 130, but transports packets such as Ethernet packets between the BBU pool 120 and the core network 150. The core network 150 may comprise interconnected sub-networks operated by network providers and service providers. The core network 150 is a central part of a network that provides network services to the users of the mobile stations.

The RRU 110 is communicatively coupled to the antennas 142 via a link 143, which may be any suitable link for transporting RF signals. The RRU 110 is a device configured to communicate with the mobile stations in designated wireless uplink (UL) RF channels and designated wireless downlink (DL) RF channels via the antennas 142. UL refers to the transmission direction from mobile stations towards a CO or a CO site 170, whereas DL refers to the transmission direction from the CO or the CO site 170 towards the mobile stations. Some examples of wireless RF channels include long-term evolution (LTE) channels, LTE-advanced (LTE-A) channels, or other evolved universal terrestrial radio access (E-UTRA) channels as defined in third generation partnership project (3GPP) specifications. The wireless RF channels may carry signals that are modulated by various modulation schemes, such as OFDM, filtered OFDM, multi-band OFDM, DFT-spread OFDM, FBMC, and/or UFMC.

The BBU pool 120 comprises a plurality of BBUs 121. The BBUs 121 are devices configured to perform BB DSP functions and wireless media access control (MAC) processing functions according to a wireless communication protocol.

In a UL direction, the RRU 110 receives UL RF signals from the mobile stations, down converts them to UL BB signals, and aggregates the UL BB signals into an aggregated UL signal. The RRU 110 then sends the aggregated UL signal to the BBU pool 120 via the fronthaul link 130. When a BBU 121 receives the aggregated UL signal from the RRU 110, the BBU 121 deaggregates the aggregated UL signal and performs BB processing and MAC processing on the deaggregated UL signals to recover the UL data transmitted by the mobile stations. The BBU 121 forwards the data to the core network 150. The BBUs 121 may coordinate with each other to jointly process one or more UL aggregated signals from one or more RRUs 110. The aggregation and deaggregation of the UL signals may be performed in a BB or an intermediate frequency (IF), as described more fully below.

In a DL direction, the core network 150 forwards DL data packets to the BBU pool 120 over the backhaul link 160. The DL data packets are destined to the mobile stations. The BBUs 121 generate DL signals for the mobile stations from corresponding DL data packets by performing BB processing and MAC processing. The BBUs 121 aggregate the DL signals into aggregated DL signals and transmit the aggregated DL signals to the RRU 110 via the fronthaul link 130. When the RRU 110 receives the aggregated DL signals from the BBU 121, the RRU 110 deaggregates the aggregated DL signals and transmits the deaggregated DL signals to the mobile stations in corresponding DL RF channels. The aggregation and deaggregation of the DL signals are similar to the aggregation and deaggregation of the UL signals, as described more fully below.

U.S. patent application Ser. No. 14/853,478 by Huaiyu Zeng, et al., and titled "Digital Representations of Analog Signals and Control Words Using Different Multi-Level Modulation Format," ('478 Application), which is incorporated by reference, describes an EMF system that digitally aggregates and deaggregates UL and DL signals in a BB or an IF by employing TDM and transports the digitized UL and DL BB signals over a fronthaul link such as the fronthaul link 130. The EMF system employs IM for optical transmission and direct-detection (DD) for optical reception.

Figure 2:
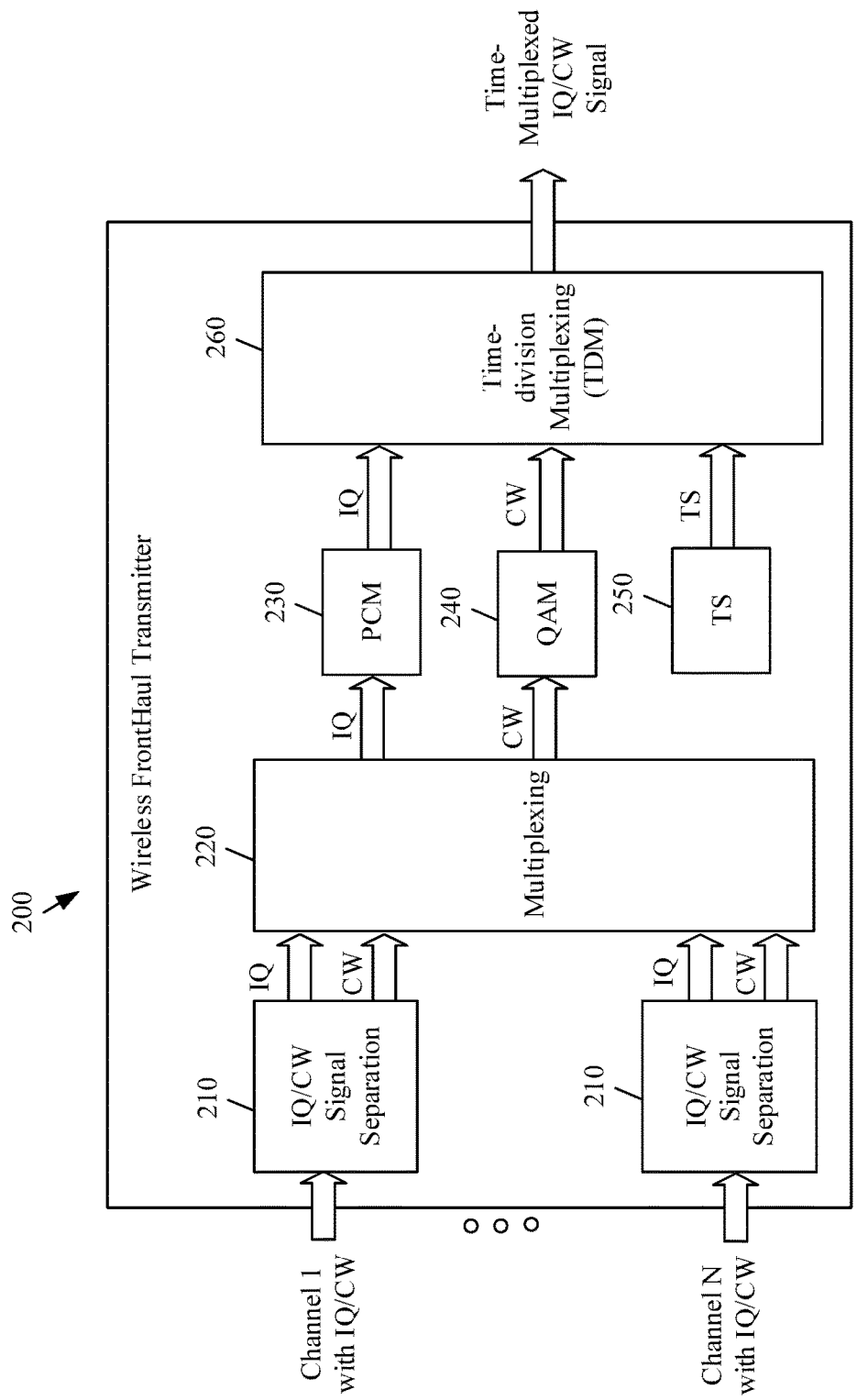
FIG. 2 is a schematic diagram of a wireless fronthaul transmitter.

FIG. 2 is a schematic diagram of a wireless fronthaul transmitter 200. The transmitter 200 is employed by the RRU 110 and/or the BBUs 121. When transmitter 200 is employed at the RRU 110, the transmitter 200 receives UL BB or IF signals corresponding to UL RF signals transmitted by mobile stations. When the transmitter 200 is employed at the BBUs 121, the transmitter 200 receives DL BB or IF signals carrying DL packets generated by a core network such as the core network 150. The RRU 110 and the BBUs 121 employ an optical frontend to modulate the output of the transmitter 200 onto a single optical carrier signal and transmit the modulated single optical carrier signal over the fronthaul link 130. The transmitter 200 comprises a plurality of IQ/control word (CW) signal separation units 210, a multiplexing unit 220, a pulse-code modulation (PCM) unit 230, a QAM unit 240, a training symbol (TS) insertion unit 250, and a TDM unit 260.

The transmitter 200 is configured to receive combined IQ/CW signals from a plurality of wireless channels, shown as Channel 1 to N. A combined IQ/CW signal carries IQ data and CW data of a wireless channel. Each IQ/CW signal separation unit 210 is configured to separate a combined IQ/CW signal into an IQ signal and a CW signal. The IQ signal comprises digital IQ representations of a particular wireless channel. The CW signal comprises CWs associated with the control and management of the particular wireless channel. The CWs may be embedded with information such as antenna configurations, power controls, and operating temperature. In an embodiment, the combined IQ/CW signals are CPRI protocol signals.

The multiplexing unit 220 is coupled to the IQ/CW signal separation units 210. The multiplexing unit 220 is configured to multiplex IQ signals of all the wireless RF channels into an aggregated IQ signal to form an aggregated IQ signal in a time domain and multiplex CW signals of all the wireless RF channels into an aggregated CW signal.

The PCM unit 230 is coupled to the multiplexing unit 220 and configured to encode the aggregated IQ signal according to a PCM scheme to produce a PCM-coded IQ signal. The QAM unit 240 is coupled to the multiplexing unit 220 and configured to encode the aggregated CW signal according to a QAM format. The QAM format may be selected based on the link SNR of a communication channel to achieve low bit error ratio (BER), for example, less than about $10^{-12}$. For example, 16-QAM may be selected for a channel with a SNR of about 23 dB to about 29 dB, 64-QAM may be selected for a channel with a SNR greater than about 29 dB, and 4-quadrature-amplitude modulation (4-QAM) may be selected for a channel with a SNR less than about 23 dB. In addition, trellis-coded modulation (TCM) may be applied to the QAM modulation to further improve the BER performance of the CW transmission.

The TDM unit 260 is coupled to the PCM unit 230, the QAM unit 240, and the TS insertion unit 250. The TDM unit 260 is configured to time-multiplex the PCM-coded IQ signal and the QAM-coded CW signal in a frame-by-frame basis. The TS insertion unit 250 is configured to insert a TS between the multiplexed IQ/CW frames. Thus, the output of the TDM unit 260 is a time-multiplexed IQ/CW signal comprising successive multiplexed IQ/CW frames separated by TSs. For example, a TS may be a predetermined time sequence, which may be employed for frame detection and synchronization at a receiver.

Figure 3:
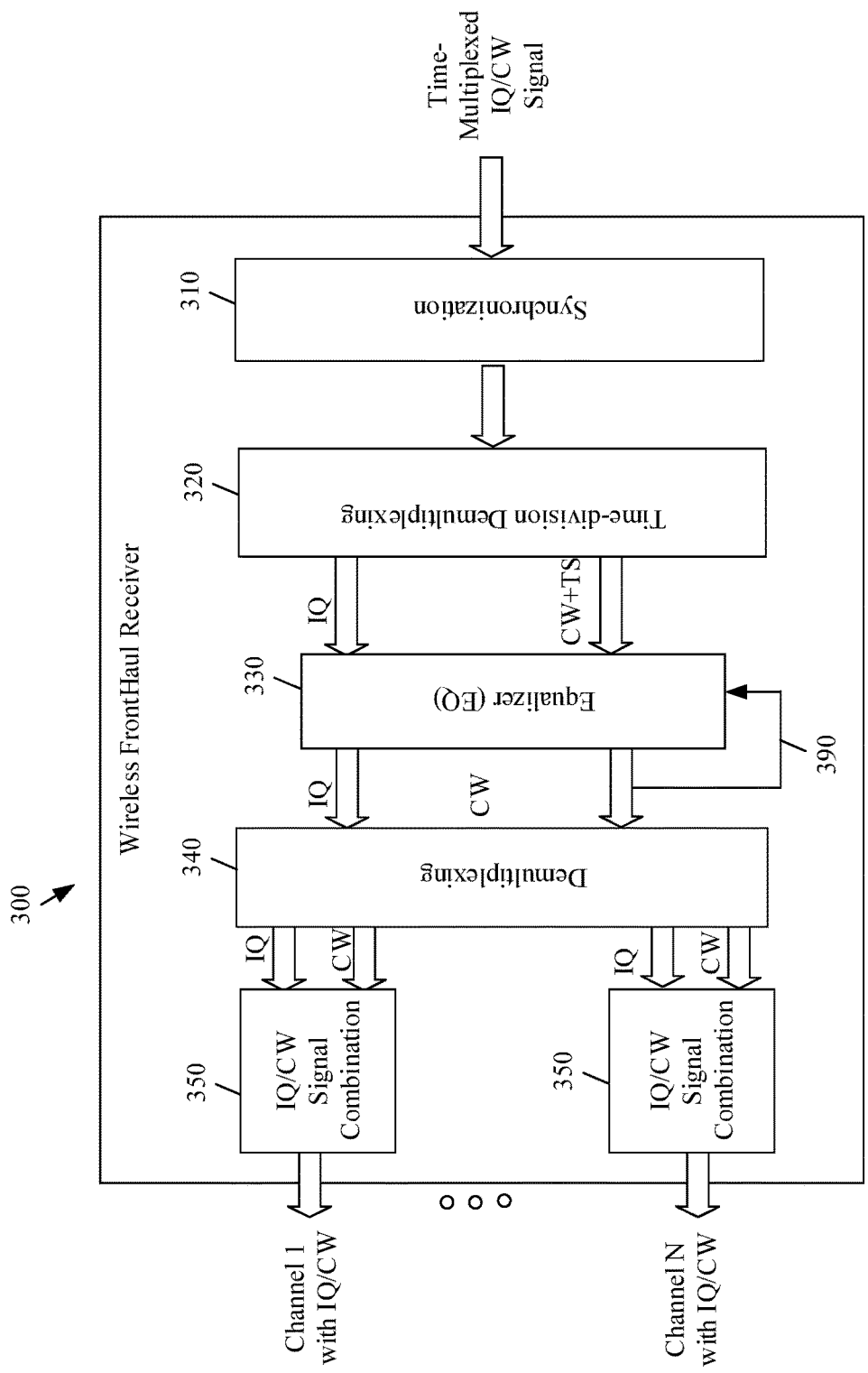
FIG. 3 is a schematic diagram of a wireless fronthaul receiver.

FIG. 3 is a schematic diagram of an embodiment of a wireless fronthaul receiver 300. The receiver 300 is employed by the RRU 110 and/or the BBUs 121. The receiver 300 receives and processes aggregated wireless IQ signals and CW signals received from a transmitter such as the transmitter 200 via a fronthaul link, such as the fronthaul link 130. When the receiver 300 is employed at the RRU 110, the received aggregated wireless IQ signals and CW signals carry DL BB or IF signals that are destined for mobile stations. When the receiver 300 is employed at the BBUs 121, the received aggregated wireless IQ signals and CW signals carry UL BB or IF signals corresponding to UL RF signals transmitted by the mobile stations. The receiver 300 comprises a synchronization unit 310, a time-division demultiplexing unit 320, an equalizer (EQ) 330, a demultiplexing unit 340, and a plurality of IQ/CW signal combination units 350.

The receiver 300 is configured to receive a time-multiplexed IQ/CW signal. For example, the time-multiplexed IQ/CW signal can be transmitted by the transmitter 200. The synchronization unit 310 is configured to detect the beginning of a frame based on TSs in the time-multiplexed IQ/CW signal. The time-division demultiplexing unit 320 is coupled to the synchronization unit 310 and configured to perform time-domain demultiplexing to separate the time-multiplexed IQ/CW signal into an IQ signal and a CW signal.

The EQ 330 is coupled to the time-division demultiplexing unit 320 and configured to perform channel equalization on the IQ signal and the CW signal. Channel equalization removes or suppresses inter-symbol interference (ISI) or inter-sample interference. The EQ 330 coefficients are trained and updated based on the CW signal, as the CW signal has a well-defined QAM constellation. In effect, the CW signal is used to aid the training and convergence of the EQ 330. The EQ 330 is further configured to demodulate the CW signal according to a predetermined modulation scheme that is employed by the transmitter of the received time-multiplexed IQ/CW signal. As shown by the arrow 390, the demodulated CW signal is passed to the EQ 330 for training and updating the EQ 330.

The demultiplexing unit 340 is coupled to the EQ 330 and configured to separate the equalized IQ data signal into multiple IQ signals and to separate the demodulated and equalized CW signal into multiple CW signals according to a predetermined time slot schedule that is employed by the transmitter of the received time-multiplexed IQ/CW signal. Each separated IQ signal and each separated CW signal correspond to a particular wireless RF channel.

The IQ/CW signal combination units 350 are coupled to the demultiplexing unit 340 and configured to combine an IQ signal and a CW signal for an associated wireless RF channel, shown as Channel 1 to Channel N.

Although the transmitter 200 and the receiver 300 are bandwidth efficient, have low DSP complexity, and have low processing latency, the transmission of the PCM-coded aggregated IQ signal over a fronthaul link may not be error free or distortion free. For example, wireless channel signals typically required about 10 bits of sample resolution and optical systems such as the transmitter 200 and the receiver 300 are typically designed with a sample resolution of about 6 bits to about 8 bits. One approach to improving performance of the EMF system is to increase the sample resolution to about 10 bits. However, system complexity and hardware cost increase as the sample resolution or the number of bits increases.

Disclosed herein are various embodiments for improving EMF transmission performance by employing CWM-CW. CWM represents an input signal waveform with two or more waveforms. In one embodiment, CWM generates a first waveform modulation signal, denoted as $W_1$, based on an approximation of an input signal, denoted as S, and a second waveform modulation signal, denoted as $W_2$, based on a difference between S and $W_1$, for example, $W_2=S-W_1$. The first waveform modulation signal $W_1$ is generated by applying a rounding function to the input signal S, for example, $W_1$=round(S), where round( ) denotes a rounding function that rounds the input to a nearest value in a set of given values. The first waveform modulation signal $W_1$ represents the input signal at a coarser resolution than the second waveform modulation signal $W_2$. A transmitter that employs CWM transmits both the first waveform modulation signal $W_1$ and the second waveform modulation signal $W_2$, after they are suitably rescaled, to a receiver. A receiver that recovers a CWM modulated signal receives both the first waveform modulation signal $W_1$ and the second waveform modulation signal $W_2$. The receiver applies a rounding function to the first waveform modulation signal $W_1$ to recover the original transmitted first waveform modulation signal $W_1$. After applying the rounding function, the receiver sums the first waveform modulation signal $W_1$ and the second waveform modulation signal $W_2$ to recover the original input signal S. In an embodiment, a wireless fronthaul system employs CWM to modulate aggregated IQ signals and embeds control signals with CWM modulated IQ signals for transmission over a wireless fronthaul link. The disclosed embodiments improve system performance without significantly increasing system complexity and hardware cost.

Although the disclosed embodiments are described in the context of a wireless fronthaul system, the disclosed CWM mechanisms may be applied to any communication system. In addition, the CWM process may be extended to represent an input signal waveform with more than two modulation waveforms. For example, the input signal S may be represented by three waveforms $W_1$, $W_2$, and $W_3$, $W_1$=round$_1$(S), $W_2$=round$_2$(S-$W_1$), and $W_3$=S-($W_1$+$W_2$), where round$_1$( ) and round$_2$( ) round an input to a nearest value in a first set of values and a second set of values, respectively. The first set of values and the second set of values may be different. Thus, the CWM process may represent S as follows, $$W_1=\text{round}_1(S),$$

$$W_i=\text{round}_i(S-\Sigma_{j=1}^{i-1}W_j), \text{ for } 1<i<N$$

$$W_N=S-\Sigma_{i=1}^{N-1}W_i. \quad (1)$$

where N is an integer number greater than 2, round$_i$( ) is a rounding function that rounds an input to a nearest value in an $i^{th}$ set of values, and each $i^{th}$ set of values may be the same or different.

Figure 4:
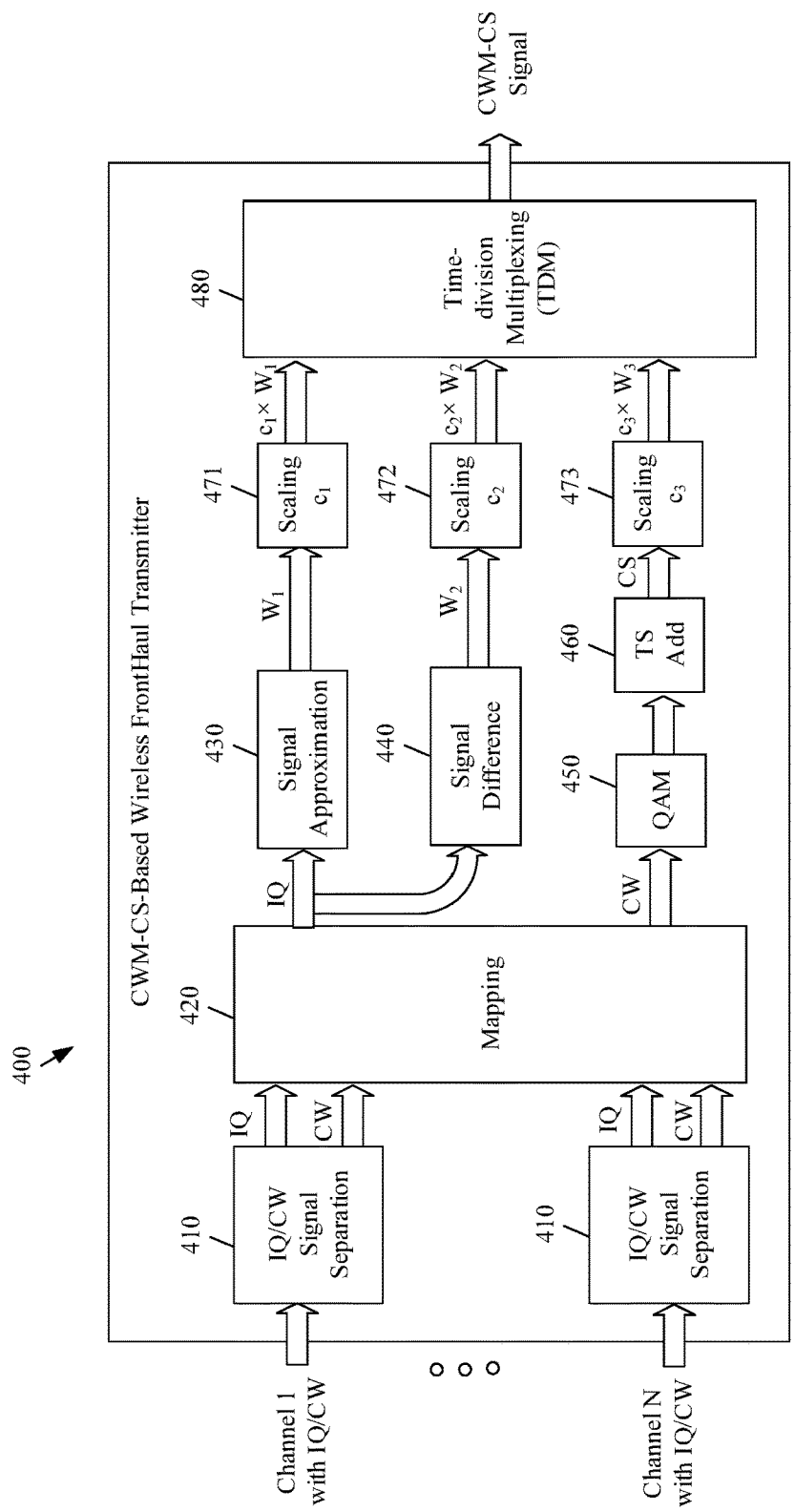
FIG. 4 is a schematic diagram of a CWM-CS-based wireless fronthaul transmitter according to an embodiment of the disclosure.

FIG. 4 is a schematic diagram of a CWM-CS-based wireless fronthaul transmitter 400 according to an embodiment of the disclosure. The transmitter 400 is employed by the RRU 110 and the BBUs 121. The transmitter 400 employs similar channel aggregation mechanisms as the transmitter 200, but performs CWM on aggregated IQ signals. The transmitter 400 comprises a plurality of IQ/CW signal separation units 410, a mapping unit 420, a signal approximation unit 430, a signal difference unit 440, a QAM unit 450, a TS insertion unit 460, scaling units 471, 472, and 473, and a TDM unit 480. The IQ/CW signal separation units 410 are similar to the IQ/CW signal separation units 210. The mapping unit 420 is similar to the multiplexing unit 220. The QAM unit is similar to the QAM unit 240. The TS insertion unit 460 is similar to the TS insertion unit 250. The TDM unit 480 is similar to the TDM unit 260.

The transmitter 400 is configured to receive combined IQ/CW signals of a plurality of wireless channels, shown as Channel 1 to N. Each IQ/CW signal separation unit 410 is configured to separate a combined IQ/CW signal into an IQ signal and a CW signal. In one embodiment, the IQ signals comprise CPRI encoded IQ data of the plurality of wireless channels and the CW signals are CPRI CWs. In another embodiment, the IQ signals are digital IQ representations of analog wireless signals of the plurality of wireless channels and the CW signals may carry any control information related to the plurality of wireless channels.

The mapping unit 420 is coupled to the IQ/CW signal separation units 410. The mapping unit 420 is configured to map IQ signals of all the wireless RF channels into an aggregated IQ signal to form an aggregated IQ signal in a time domain and map CW signals of all the wireless RF channels into an aggregated CW signal. The aggregated IQ signal is passed to both the signal approximation unit 430 and the signal difference unit 440 for CWM.

The signal approximation unit 430 is coupled to the mapping unit 420. The signal approximation unit 430 is configured to apply a rounding function on the aggregated IQ signal to produce a first waveform modulation signal as shown below:

$$W_1 = \text{round}\left(\frac{S}{E_{max}} \times M\right) \times \frac{E_{max}}{M}, \quad (2)$$

where $W_1$ represents the first waveform modulation signal, round( ) is a rounding function that rounds decimal numbers to nearest complex integers, S represents the aggregated IQ signal, $E_{max}$ is a real number that is associated with the maximum signal amplitude of S, and M is a positive integer. The first waveform modulation signal $W_1$ is an approximation of the aggregated IQ signal S. The first waveform modulation signal $W_1$ comprises $(2M+1)^2$ number of distinct signal values. The value of M may be selected based on the fronthaul link SNR, as described more fully below. For example, M may be an integer value between about 4 to about 8.

The aggregated IQ signal S comprises an in-phase (I) component and a quadrature-phase (Q) component represented as follows:

$$S_I = \text{real}(S) = a \sum_{n=1}^{N} 2^{n-1}\left(i_n - \frac{1}{2}\right), \quad (3)$$

$$S_Q = \text{imag}(S) = b \sum_{n=1}^{N} 2^{n-1}\left(q_n - \frac{1}{2}\right),$$

where $S_I$ represents the I component of S, which is represented by N bits, denoted as $i_n$ for $1 \le n \le N$, $S_Q$ represents the Q component of S, which is represented by N bits, denoted as $q_n$ for $1 \le n \le N$, and a and b are quantities related to the sampling resolutions of the I component and the Q component. As shown, $S_I$ equals to real(S), which is the real component of S, and $S_Q$ equals to imag(S), which is the imaginary component of S. Thus, the first waveform modulation signal $W_1$ is expressed as shown below:

$$W_1 = \text{MSB}\left(a \sum_{n=N-m+1}^{N} 2^{n-1}\left(i_n - \frac{1}{2}\right) + jb \sum_{n=N-m+1}^{N} 2^{n-1}\left(q_n - \frac{1}{2}\right)\right), \quad (4)$$

where MSB is an arithmetic MSB function that extracts a number of MSBs of a number. For example, $W_1$ is computed by obtaining a number of MSBs of $$\left(a \sum_{n=N-m+1}^{N} 2^{n-1}\left(i_n - \frac{1}{2}\right) + jb \sum_{n=N-m+1}^{N} 2^{n-1}\left(q_n - \frac{1}{2}\right)\right).$$

The signal difference unit 440 is coupled to the mapping unit 420 and the signal approximation unit 430. The signal difference unit 440 is configured to generate a second waveform modulation signal, denoted as $W_2$, based on a difference between the first waveform modulation signal $W_1$ and the aggregated IQ signal S as follows:

$$W_2 = S - W_1. \quad (5)$$

In effect, the first waveform modulation signal $W_1$ represents the aggregated signal S at a coarse signal resolution on an integer grid and the second waveform modulation signal $W_2$ represents the difference between $W_1$ and the original signal S. In an embodiment, the first waveform modulation signal $W_1$ and the second waveform modulation signal $W_2$ may be represented by employing about 5 bits per sample. Typical wireless channel signals require a sample resolution of about 10 bits, but optical systems typically operate on a sample resolution of about 6 bits. Thus, by dividing the aggregated signal S into multiple cascaded signal components, the employment of less number of bits per sample is allowed in the implementation of the transmitter 400. Although FIG. 4 illustrates CWM with two cascaded waveforms (e.g., $W_1$ and $W_2$), CWM may be applied to a signal with any number cascaded waveforms as described above in equation (1).

The QAM unit 450 is coupled to the mapping unit 420 and configured to encode the aggregated CW signal according to a QAM scheme such as 4-QAM and 16-QAM to produce a QAM-coded control signal, denoted as CS. The TS insertion unit 460 is coupled to the QAM unit 450 and configured to append a TS to the QAM-coded CW signal to produce a control signal.

The scaling unit 471 is coupled to the signal approximation unit 430 and configured to scale signal amplitudes of the first waveform modulation signal $W_1$ by a scale factor $c_1$ to produce a first scaled waveform modulation signal, denoted as $c_1 \times W_1$. The scaling unit 472 is coupled to the signal difference unit 440 and configured to scale signal amplitudes of the second waveform modulation signal $W_2$ by a scale factor $c_2$ to produce a second scaled waveform modulation signal, denoted as $c_2 \times W_2$. The scaling unit 473 is coupled to the TS insertion unit 460 and configured to scale signal amplitudes of the control signal CS by a scale factor $c_3$ to produce a scaled control signal, denoted as $c_3 \times CS$. The scale factors $c_1$, $c_2$, and $c_3$ may be any suitable values such that the first scaled waveform modulation signal, the second scaled waveform modulation signal, and the scaled control signal have similar maximum signal amplitudes.

The TDM unit 480 is coupled to the scaling units 471-473 and configured to time-multiplex the first scaled waveform modulation signal, the second scaled waveform modulation signal, and the scaled control signal into a CWM-CS signal. In an embodiment, the IQ/CW signal separation units 410 receive signal on a frame-by-frame basis. Thus, the TS appended by the TS insertion unit 460 acts as a frame preamble separating frames and may be used by a receiver for frame synchronization and channel equalization. The CWM-CS signal may be modulated onto a single carrier for transmission.

Figure 5:
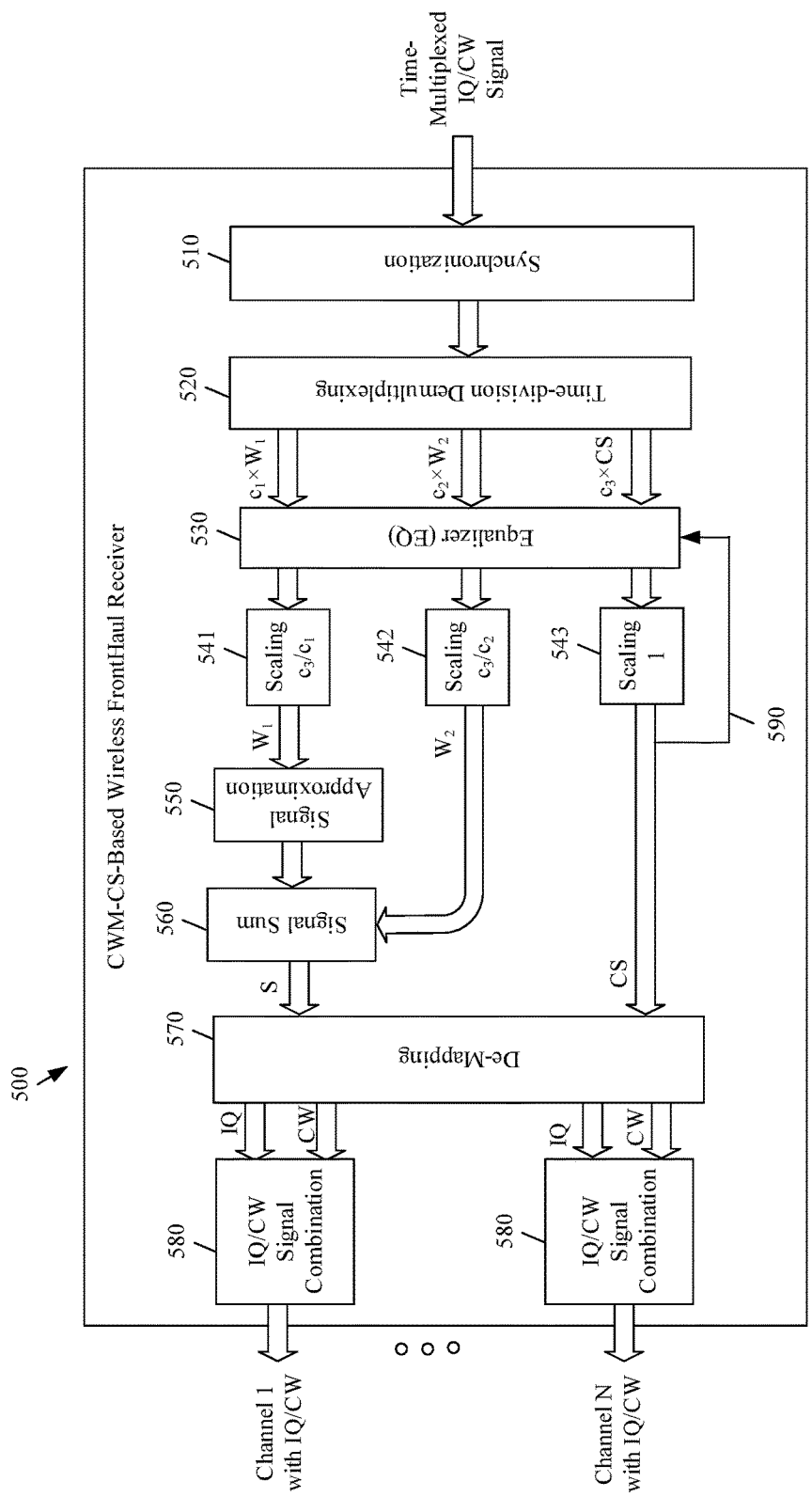
FIG. 5 is a schematic diagram of a CWM-CS-based wireless fronthaul receiver according to an embodiment of the disclosure.

FIG. 5 is a schematic diagram of a CWM-CS-based receiver 500 according to an embodiment of the disclosure. The receiver 500 is employed by the RRU 110 and the BBUs 121. The receiver 500 employs similar channel deaggregation mechanisms as the receiver 300, but performs CWM demodulation. The receiver 500 comprises a synchronization unit 510, a time-division demultiplexing unit 520, an EQ 530, scaling units 541, 542, and 543, a signal approximation unit 550, a signal sum unit 560, a de-mapping unit 570, and a plurality of IQ/CW signal combination units 580. The synchronization unit 510 is similar to the synchronization unit 310. The time-division demultiplexing unit 520 is similar to the time-domain demultiplexing unit 320. The EQ 530 is similar to the EQ 330. The de-mapping unit 570 is similar to the demultiplexing unit 340. The IQ/CW signal combination units 580 are similar to the IQ/CW signal combination units 350.

The receiver 500 is configured to receive a CWM-CS signal. For example, the CWM-CS signal is transmitted by the transmitter 400. The synchronization unit 510 is configured to perform frame synchronization based on TSs in the CWM-CS signal. The time-division demultiplexing unit 520 is coupled to the synchronization unit 510. The time-division demultiplexing unit 520 is configured to perform time-domain demultiplexing to separate the CWM-CS signal into a first scaled waveform modulation signal associated with an IQ signal, denoted as $c_1 \times W_1$, a second scaled waveform modulation signal associated with the IQ signal, denoted as $c_2 \times W_2$, and a scaled control signal $c_3 \times CS$, where $c_1$, $c_2$, and $c_3$ are scale factors applied by the transmitter. The scaled control signal is denoted as $c_3 \times CS$, where $c_3$ is a scale factor applied by the transmitter. The first scaled waveform modulation signal is an approximation of an IQ signal and the second waveform modulation signal is a difference between the IQ signal and the first waveform modulation. For example, the transmitter generates the first waveform modulation signal and the second waveform modulation signal according to equations (2) and (5), respectively.

The EQ 530 is coupled to the time-division demultiplexing unit 520. The EQ 530 performs channel equalization on the first scaled waveform modulation signal, the second scaled waveform modulation signal, and the control signal. In addition, the EQ 530 demodulates the scaled control signal according to a predetermined modulation scheme. The demodulated scaled control signal is fed back to the EQ 530 to train and update the EQ 530 coefficients, as shown by the arrow 590.

The scaling units 541, 542, and 543 are coupled to the EQ 530 and configured to scale signal amplitudes of the first scaled waveform modulation signal, the second scaled waveform modulation signal, and the scaled control signal, respectively, to remove scaling performed by the transmitter. For example, the scaling units 541, 542, and 543 scale the first scaled waveform modulation signal, the second scaled waveform modulation signal, and the scaled control signal by scale factors of $c_3/c_1$, $c_3/c_2$, and 1, respectively. After removing the scaling, the first waveform modulation signal $W_1$, the second waveform modulation signal $W_2$, and the control signal CS are obtained.

The signal approximation unit 550 is coupled to the scaling unit 541 and configured to apply a rounding function to the first waveform modulation signal $W_1$ to recover the original transmitted first waveform modulation signal according to equation (3). The signal sum unit 560 is coupled to the signal approximation unit 550 and the scaling unit 542. The signal sum unit 560 is configured to sum the first waveform modulation signal $W_1$ and the second waveform modulation signal $W_2$ to recover the original transmitted IQ signal, denoted as S.

The de-mapping unit 570 is coupled to the signal sum unit 560 and the scaling unit 543. The de-mapping unit 570 is configured to separate the recovered IQ signal S into multiple IQ signals and to separate the control signal CS into multiple CW signals according to a predetermined time slot schedule used by the transmitter. Each separated IQ signal and each CW signal correspond to a particular wireless RF channel.

The IQ/CW signal combination units 580 are coupled to the de-mapping unit 570 and configured to combine an IQ time-domain signal and a CW signal for an associated wireless RF channel shown as Channel 1 to Channel N.

Figure 6:
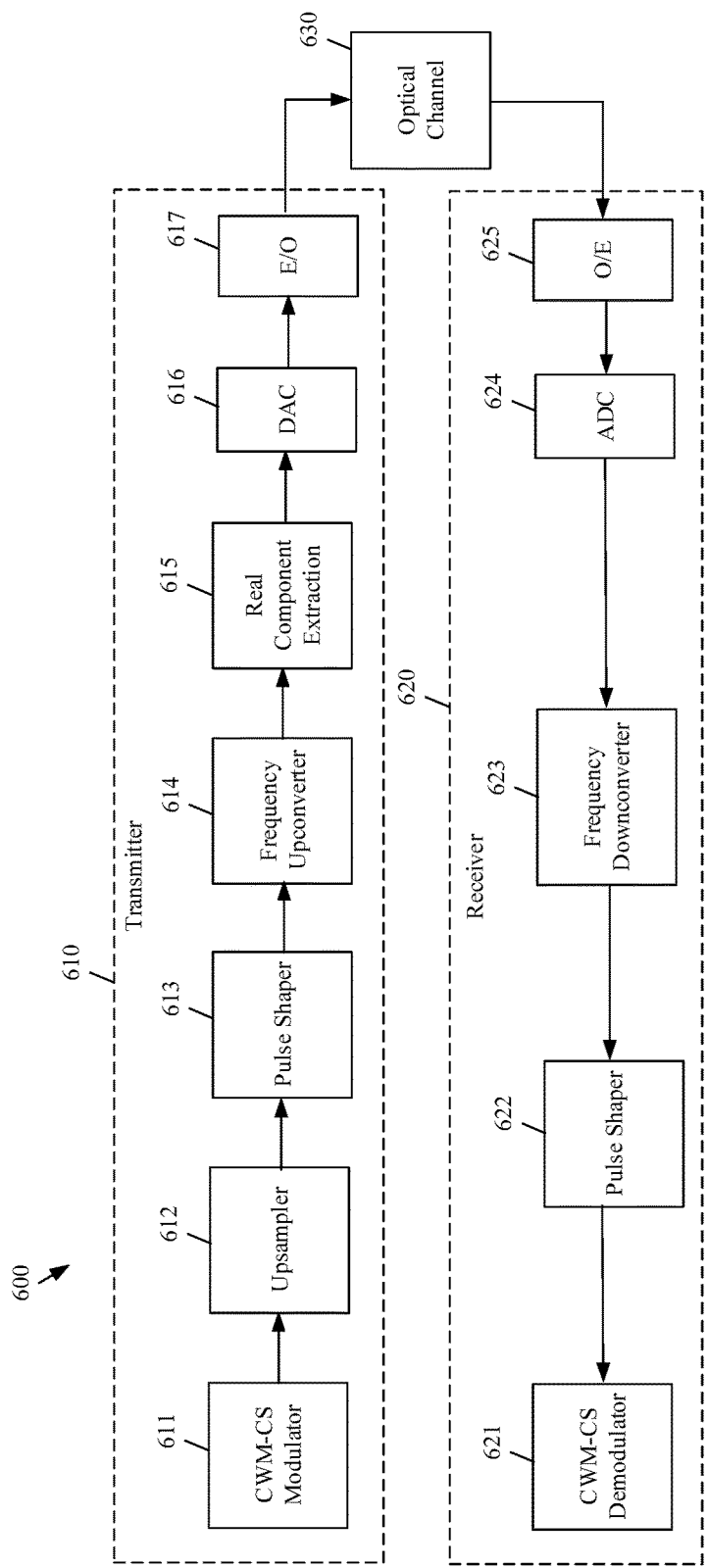
FIG. 6 is a schematic diagram of a CWM-CS-based transmission system according to an embodiment of the disclosure.

FIG. 6 is a schematic diagram of a CWM-CS-based transmission system 600 according to an embodiment of the disclosure. The system 600 comprises a transmitter 610 communicatively coupled to a receiver 620 by an optical channel 630. The system 600 is employed by a wireless fronthaul system such as the system 100. For example, in a DS direction, the BBUs 121 may employ the transmitter 610 for DS transmissions and the RRU 110 may employ the receiver 620 for DS receptions. Alternatively, in a US direction, the RRU 110 may employ the transmitter 610 for US transmissions and the BBUs 121 may employ the receiver 620 for US receptions. The transmitter 610 comprises a CWM-CS modulator 611, an upsampler 612, a first pulse shaper 613, a frequency upconverter 614, a real component extraction unit 615, a digital-to-analog converter (DAC) 616, and an electrical-to-optical (E/O) unit 617. The receiver 620 comprises an optical-to-electrical (O/E) unit 625, an analog-to-digital converter (ADC) 624, a frequency downconverter 623, a second pulse shaper 622, and a CWM-CS demodulator 621.

In a transmit path, the CWM-CS modulator 611 is configured to perform similar CWM modulation and channel aggregation as the transmitter 400. The upsampler 612 is coupled to the CWM-CS modulator 611 and configured to perform upsampling on the CWM-CS signal. Upsampling may ease filter cut-off in later stages when employing filters for upconverting BB signals to passbands signals.

The first pulse shaper 613 is coupled to the upsampler 612 and configured to perform pulse shaping on the upsampled signal, for example, to limit the bandwidth of the upsampled signal. The frequency upconverter 614 is coupled to the first pulse shaper 613 and configured to perform frequency upconversion on the pulse-shaped signal. The real component extraction unit 615 is coupled to the frequency upconverter 614. The output of the frequency upconverter 614 is a complex signal. The real component extraction unit 615 is configured to extract the real signal component of the complex signal. The DAC 616 is coupled to the real component extraction unit 615. The DAC 616 is configured to convert the real signal component into an analog electrical signal. The E/O unit 617 is coupled to the DAC 616. For example, the E/O unit 617 comprises a directly-modulated laser (DML). The output of the DAC 616 is used to drive the DML, which is suitably biased, to generate an optical IM signal. The IM signal is then transmitted over the optical channel 630.

In a receive path, the O/E unit 625 is configured to receive the optical signal from the optical channel 630. The optical signal carries the CWM-CS signal. For example, the O/E unit 625 comprises a photo-detector (PIN) that converts the received optical signal into an analog electrical signal. The ADC 624 is coupled to the O/E unit 625. The ADC 624 is configured to sample the analog electrical signal to produce a digital signal. The frequency downconverter 623 is coupled to the ADC 624 and configured to downconvert the digital signal to a BB signal. The second pulse shaper 622 is coupled to the ADC 624. The second pulse shaper 622 is similar to the first pulse shaper 613. For example, the second pulse shaper 622 shapes the frequency spectrum of the BB signal to limit the bandwidth of the BB signal. The CWM-CS demodulator 621 is coupled to the second pulse shaper 622. The CWM-CS demodulator 621 is configured to perform similar CWM demodulation and channel deaggregation as the receiver 500.

Figure 7:
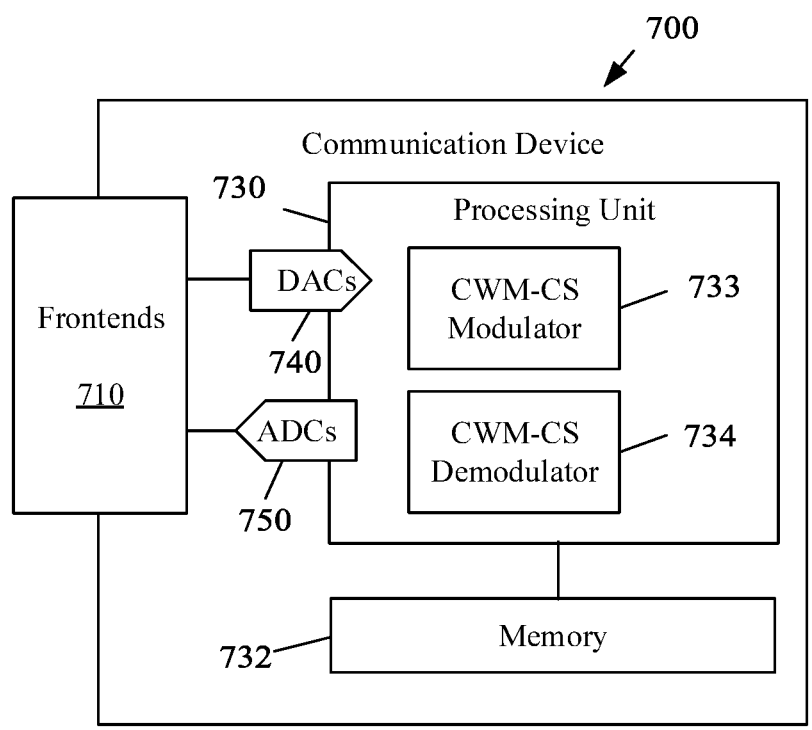
FIG. 7 is a schematic diagram of an embodiment of a fronthaul communication transceiver unit.

FIG. 7 is a schematic diagram of an embodiment of a communication device 700, which may be any device that transmits or receives optical signals or RF signals. For example, the communication device 700 may be located in an optical communication device such as the RRU 110 and the BBUs 121 in a wireless fronthaul communication system such as the system 100 (or any other device or system disclosed herein). The communication device 700 is suitable for implementing the disclosed embodiments. One skilled in the art will recognize that the term "communication device" encompasses a broad range of devices of which communication device 700 is merely an example. The communication device 700 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a communication device 700. For instance, the features and methods in the disclosure may be implemented using hardware, firmware, and/or software installed to run on hardware. As shown in FIG. 7, the communication device 700 comprises a plurality of frontends 710. The frontends 710 may comprise an optical frontend and/or a RF frontend. For example, the optical frontend may comprise E/O components and/or O/E components that convert an electrical signal to an optical signal for transmission in a wireless fronthaul optical network and/or receive an optical signal from the wireless fronthaul network and convert the optical signal to an electrical signal, respectively. The RF frontend may comprise RF components, RF devices that receive and transmit wireless RF signals.

A processing unit 730 is coupled to the frontends 710 via a plurality of DACs 740 and ADCs 750. The DACs 740 convert digital electrical signals generated by the processing unit 730 into analog electrical signals that are fed into the frontend 710. The ADCs 750 convert analog electrical signals received from the frontends 710 into digital electrical signals that are processed by the processing unit 730. In some embodiments, the ADCs 750 and the DACs 740 may be integrated with the processing unit 730. The processing unit 730 may be implemented as one or more central processing unit (CPU) chips, cores (e.g., as a multi-core processor), field-programmable gate arrays (FPGAs), application specific integrated circuits (ASICs), and DSPs. The processing unit 730 comprises a CWM-CS modulator 733 and a CWM-CS demodulator 734.

The CWM-CS modulator 733 implements CWM of aggregated wireless channel signals with embedded QAM coded control signals as described in transmitter 400, the methods 1000, 1100, and 1200, and/or other flowcharts, schemes, and methods, as described more fully below. The CWM-CS demodulator 734 implements recovery of CWM modulated wireless channel signals and QAM coded control signals as described in the receiver 500, the methods 1300 and 1400, and/or other flowcharts, schemes, and methods, as described more fully below. The inclusion of the CWM-CS modulator 733 and the CWM-CS demodulator 734 therefore provides a substantial improvement to the functionality of the communication device 700 and effects a transformation of the communication device 700 to a different state. In an alternative embodiment, the CWM-CS modulator 733 and the CWM-CS demodulator 734 may be implemented as instructions stored in the memory 732, which may be executed by the processing unit 730. Further, in alternative embodiments, the communication device 700 may comprise any other device or system for implementing the methods 1000, 1100, 1200, 1300, and 1400.

The memory 732 comprises one or more disks, tape drives, and solid-state drives and may be used as an overflow data storage device, to store programs when such programs are selected for execution, and to store instructions and data that are read during program execution. The memory 732 may be volatile and/or non-volatile, and may be read-only memory (ROM), random-access memory (RAM), ternary content-addressable memory (TCAM), or static random-access memory (SRAM).

Figure 8:
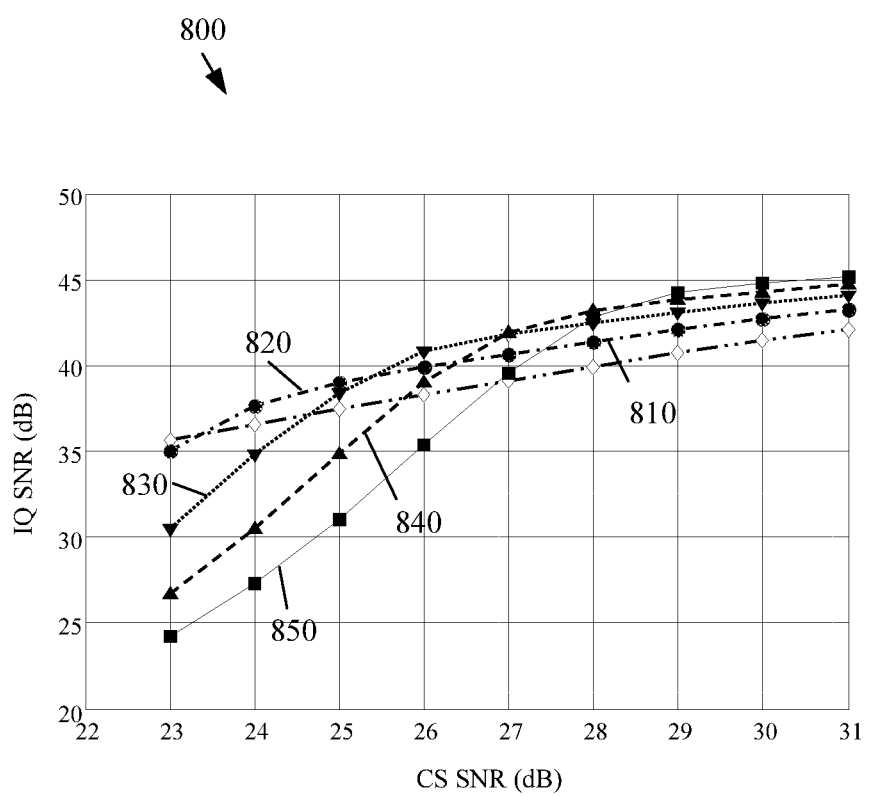
FIG. 8 is a graph illustrating numerically simulated SNR performance of a CWM-CS-based transmission system according to an embodiment of the disclosure.
Figure 9:
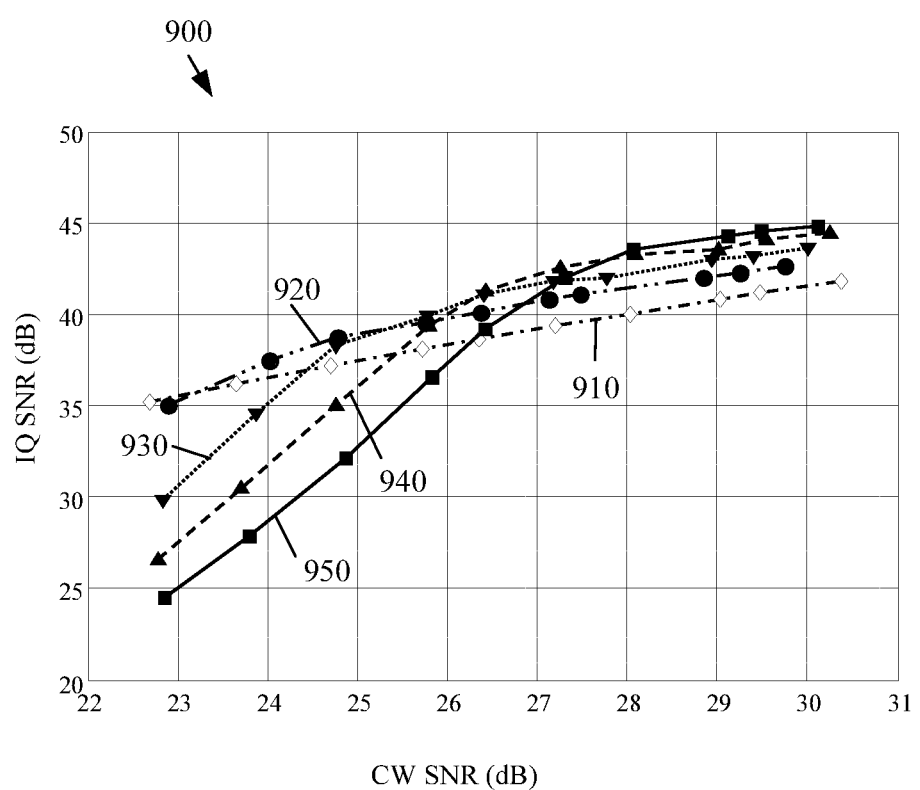
FIG. 9 is a graph illustrating experimentally measured SNR performance of a CWM-CS-based transmission system according to an embodiment of the disclosure.

FIGS. 8-9 illustrate performance improvements provided by CWM. The x-axis represents CS SNRs in units of dBs. The y-axis represents the recovered IQ SNRs in units of dBs. The CS SNRs represent link SNRs. FIG. 8 is a graph 800 illustrating numerically simulated SNR performance for a CWM-CS-based transmission system such as the system 600 according to an embodiment of the disclosure. The graph 800 is generated by transmitting a CWM modulated IQ signal with an embedded QAM modulated control signal at the CWM-CS modulator 611 and measuring SNRs of the recovered CWM modulated IQ signal and the recovered QAM modulated control signal at the CWM-CS demodulator 621. The plots 810, 820, 830, 840, and 850 show IQ SNRs obtained from the recovered CWM modulated IQ signal as a function of CS SNRs of the recovered QAM modulated control signal when M of equation (1) is set to values of 4, 5, 6, 7, and 8, respectively. As described above, equation (1) generates a first waveform modulation signal with $(2M+1)^2$ distinct complex values. For example, when M is set to a value of 4, 5, 6, 7, or 8, a CWM modulated IQ signal has 81, 121, 169, 255, or 289 complex values, respectively.

As shown, the SNRs of the recovered CWM modulated IQ signals are higher than the CS SNRs. Since CS SNRs represent link SNR, CWM improves SNR performance. For example, at a CS SNR of about 30 dB, the IQ SNRs are improved to approximately 41 dB, 42.5 dB, 44 dB, 44.5 dB, and 45 dB when the M values are set to 4, 5, 6, 7, and 8, respectively. On the other hand, at a CS SNR of about 23 dB, the IQ SNRs are improved to approximately 35.5 dB, 35 dB, 30.5 dB, 27 dB, and 24 dB when the M values are set to 4, 5, 6, 7, and 8, respectively. Thus, a M value of 8 provides the best performance when the link SNR is high, whereas a M value of 4 provides the best performance when the link SNR is low. For a given CS SNR between about 23 dB and about 30 dB, there is an optimum value of M that provides the best SNR performance for the recovered signal CWM modulated IQ signal. As such, the value of M may be adapted in the CWM process based on the link SNR to optimize the transmission performance of the IQ signal.

FIG. 9 is a graph 900 illustrating experimentally measured SNR performance for a CWM-CS-based transmission system such as the system 600 according to an embodiment of the disclosure. The plots 910, 920, 930, 940, and 950 show IQ SNRs obtained from a recovered CWM modulated IQ signal as a function of CS SNRs of a recovered control signal when M of equation (1) is set to values of 4, 5, 6, 7, and 8, respectively. As show, when the link SNR or the CS SNR is high, for example, at about 30 dB, a M value of 8 provides the best performance with a gain of about 13 dB. When the link SNR or the CS SNR is low, for example, at about 23 dB, a M value of 4 provides the best performance with a gain of about 12 dB. Compare the graphs 800 and 900, the experimental results show similar trends as the simulation results.

Figure 10:
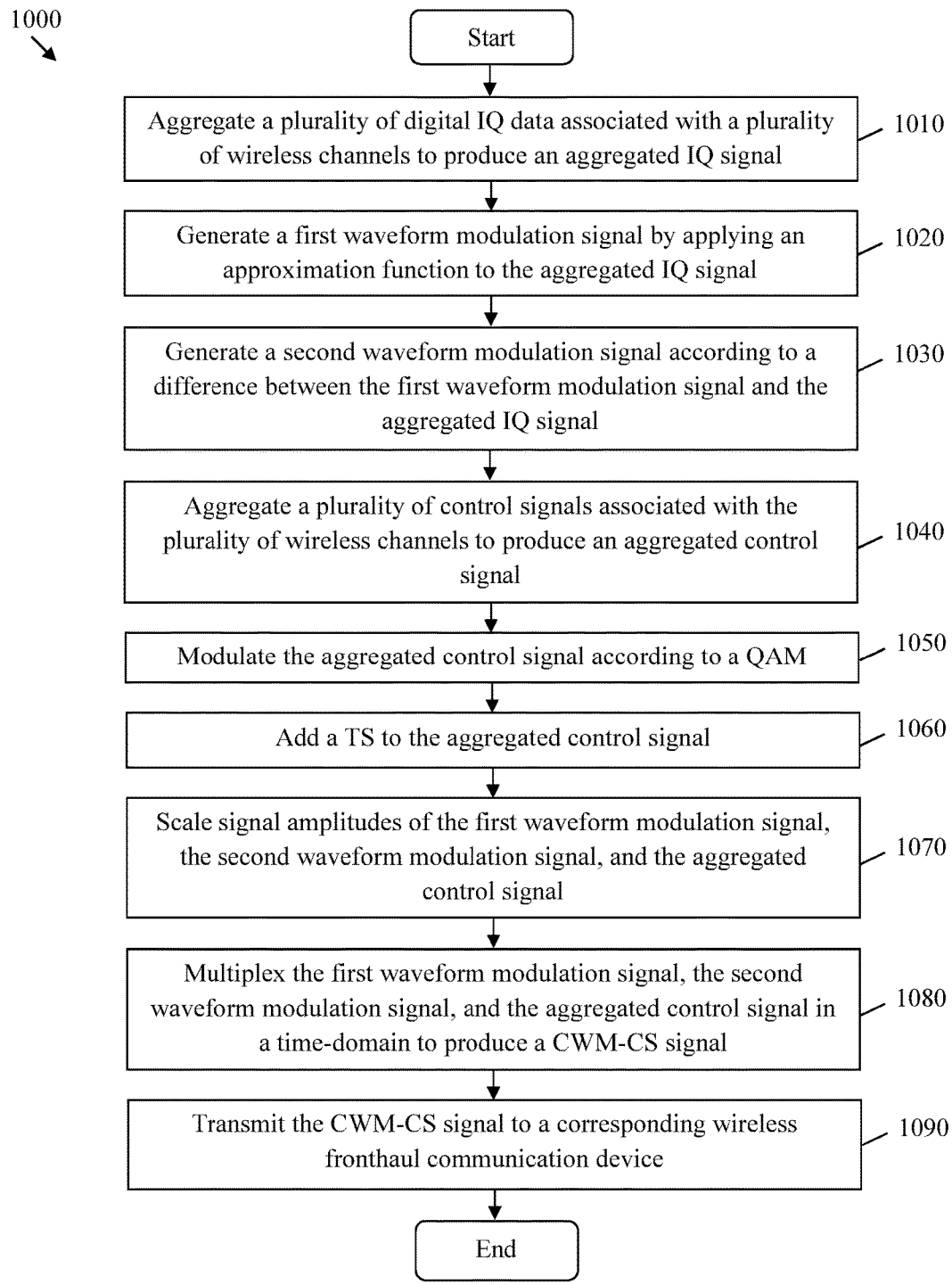
FIG. 10 is a flowchart of a method of performing CWM-CS-based wireless fronthaul transmitter processing according to an embodiment of the disclosure.

FIG. 10 is a flowchart of a method 1000 of performing CWM-CS-based wireless fronthaul transmitter processing according to an embodiment of the disclosure. The method 1000 is implemented by a communication device such as the RRU 110, BBUs 121, the transmitter 400, and the CWM-CS modulator 611, any of which may be implemented as the communication device 700. The method 1000 employs similar mechanisms as the transmitter 400. The method 1000 is implemented when receiving a digital IQ data associated with a plurality of wireless channels. At step 1010, a plurality of digital IQ data associated with a plurality of wireless channels are aggregated to produce an aggregated IQ signal, for example, by employing the mapping unit 420. At step 1020, a first waveform modulation signal is generated by applying an approximation function to the aggregated IQ signal according to equations (1) and (3), for example, by employing the signal approximation unit 430. At step 1030, a second waveform modulation signal is generated according to a difference between the first waveform modulation signal and the aggregated IQ signal according to equation (4), for example, by employing the signal difference unit 440. At step 1040, a plurality of control signals associated with the plurality of wireless channels are aggregated to produce an aggregated control signal, for example, by employing the mapping unit 420. At step 1050, the aggregated control signal is modulated according to a predetermined QAM format, for example, by employing the QAM unit 450. At step 1060, a TS is added to the aggregated control signal, for example, by employing the TS insertion unit 460. At step 1070, signal amplitudes of the first waveform modulation signal, the second waveform modulation signal, and the aggregated control signal are scaled, for example, by employing the scaling units 471-473. The scaling is performed such that the maximum signal amplitudes of the first waveform modulation signal, the second waveform modulation signal, and the aggregated control signal are similar. At step 1080, the first waveform modulation signal, the second waveform modulation signal, and the aggregated control signal are multiplexed in a time-domain to produce a CWM-CS signal, for example, by employing the TDM unit 480. At step 1090, the CWM-CS signal is transmitted to a corresponding wireless fronthaul communication device. For example, the CWM-CS signal is modulated onto a single optical carrier via IM for transmission over a wireless fronthaul link such as the fronthaul link 130 and the optical channel 630.

Figure 11:
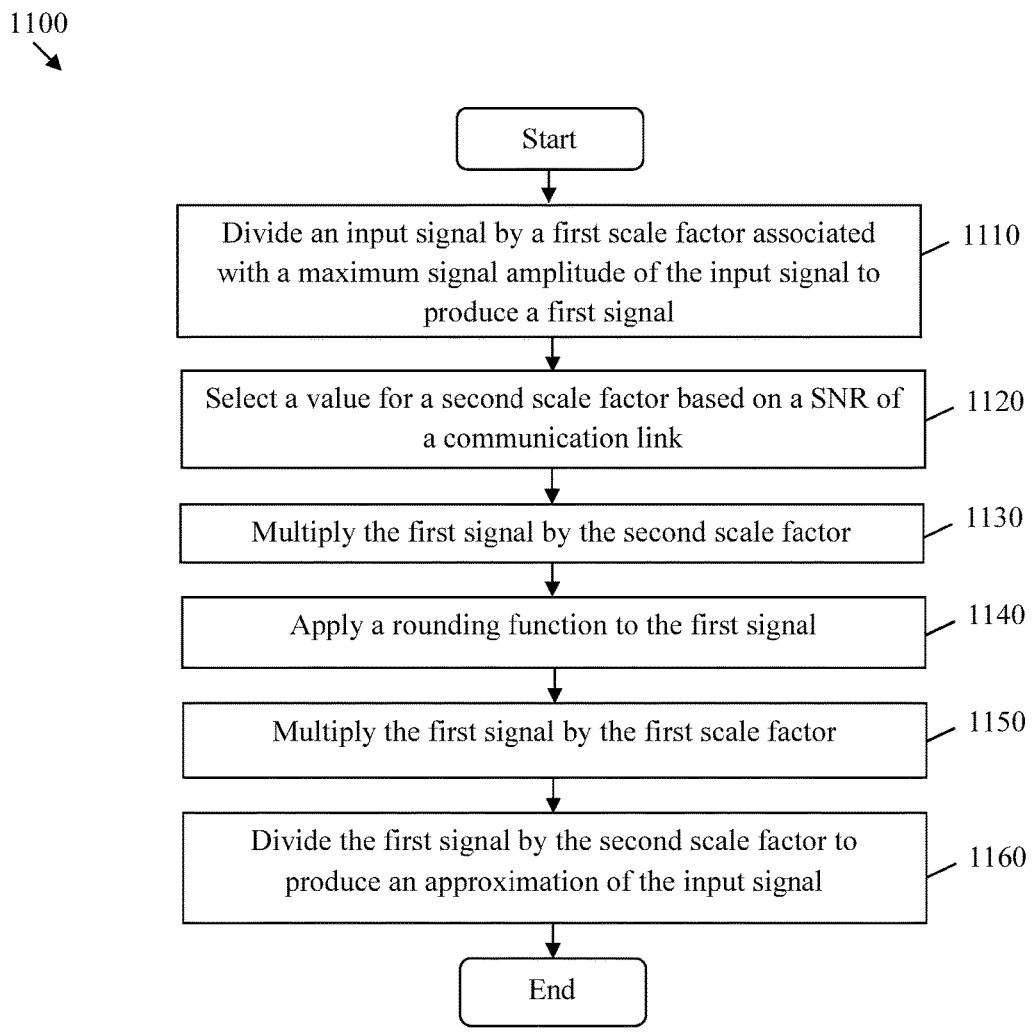
FIG. 11 is a flowchart of a method of generating an approximation signal for CWM according to an embodiment of the disclosure.

FIG. 11 is a flowchart of a method 1100 of generating an approximation signal for CWM according to an embodiment of the disclosure. The method 1100 is implemented by a communication device such as the RRU 110, BBUs 121, the transmitter 400, and the CWM-CS modulator 611, any of which may be implemented as the communication device 700. The method 1100 employs similar mechanisms as the transmitter 400 and the method 1000. The method 1100 is performed, for example, during the steps 1020 of FIG. 10. The method 1100 is implemented when performing CWM. At step 1110, an input signal is divided by a first scale factor associated with a maximum signal amplitude of the input signal to produce a first signal. For example, the first scale factor is the maximum signal amplitude of the input signal, where the maximum signal amplitude corresponds to $E_{max}$ of equation (2). At step 1120, a value for a second scale factor is selected based on the SNR of a communication link used for transmission, for example, as shown in the graphs 800 and 900. The second scale factor corresponds to M of equation (2). For example, the second scale factor is selected such that the CWM provides the best transmission performance under the SNR of the communication link. Thus, the value of the second scale factor may be adapted as the channel condition varies. At step 1130, the first signal is multiplied by the second scale factor. At step 1140, a rounding function is applied to the first signal. At step 1150, the first signal is multiplied by the first scale factor. At step 1160, the first signal is divided by the second scale factor. For example, the approximation corresponds to first waveform modulation signal generated at the step 1020.

Figure 12:
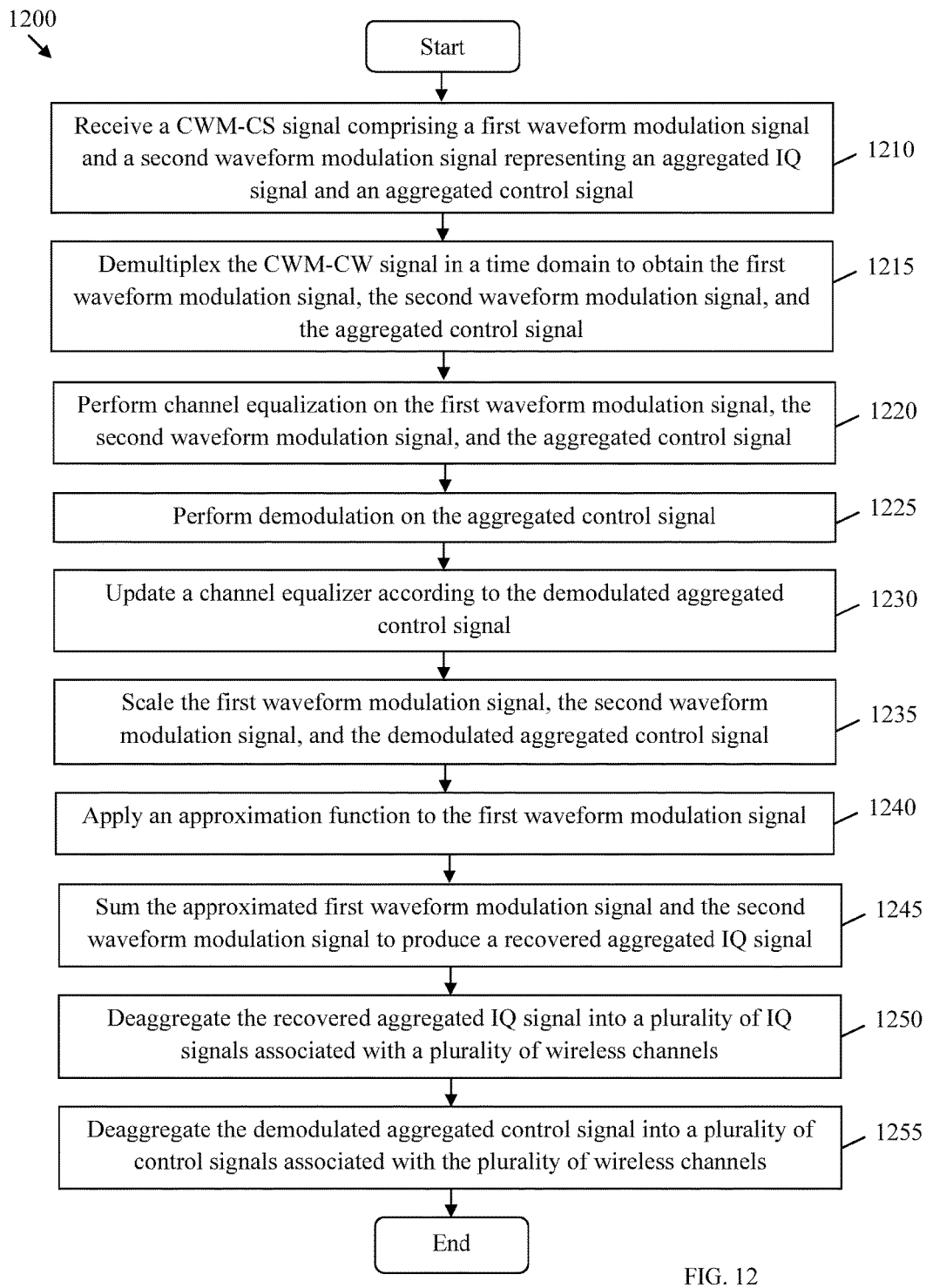
FIG. 12 is a flowchart of a method of performing CWM-CS-based wireless fronthaul receiver processing according to an embodiment of the disclosure.

FIG. 12 is a flowchart of a method 1200 of performing CWM-CS-based wireless fronthaul receiver processing according to an embodiment of the disclosure. The method 1200 is implemented by a communication device such as the RRU 110, BBUs 121, the receiver 500, and the CWM-CS demodulator 621, any of which may be implemented as the communication device 700. The method 1300 employs similar mechanisms as the receiver 500. The method 1200 is implemented when receiving a CWM-CS signal transmitted by a transmitter such as the transmitter 400 via a communication link such as the fronthaul link 130 and the optical channel 630. At step 1210, a CWM-CS signal comprising a first waveform modulation signal and a second waveform modulation signal representing an aggregated IQ signal with different resolutions and an aggregated control signal is received. At step 1215, the CWM-CS signal is demultiplexed in a time domain to obtain the first waveform modulation signal, the second waveform modulation signal, and the aggregated control signal, for example, by employing the time-division demultiplexing unit 520. At step 1220, channel equalization is performed on the first waveform modulation signal, the second waveform modulation signal, and the aggregated control signal, for example, by employing the EQ 530. At step 1225, demodulation is performed on the aggregated control signal, for example, by employing the EQ 530. At step 1230, the channel equalizer is updated according to the demodulated aggregated control signal. At step 1235, signal amplitudes of the first waveform modulation signal, the second waveform modulation signal, and the demodulated aggregated control signal are scaled, for example, by employing the scaling units 541-543. At step 1240, an approximation function is applied to the first waveform modulation signal to produce an approximated first waveform modulation signal, for example, by employing the signal approximation unit 550. The approximation may be a rounding function. At step 1245, the approximated first waveform modulation signal and second waveform modulation signal are summed to produce a recovered aggregated IQ signal, for example, by employing the signal sum unit 560. At step 1250, the recovered aggregated IQ signal is deaggregated into a plurality of IQ signals associated with a plurality of wireless channels, for example, by employing a de-mapping unit 570. At step 1255, the demodulated aggregated control signal is deaggregated into a plurality of control signals associated with the plurality of wireless channels, for example, by employing a de-mapping unit 570.

Figure 13:
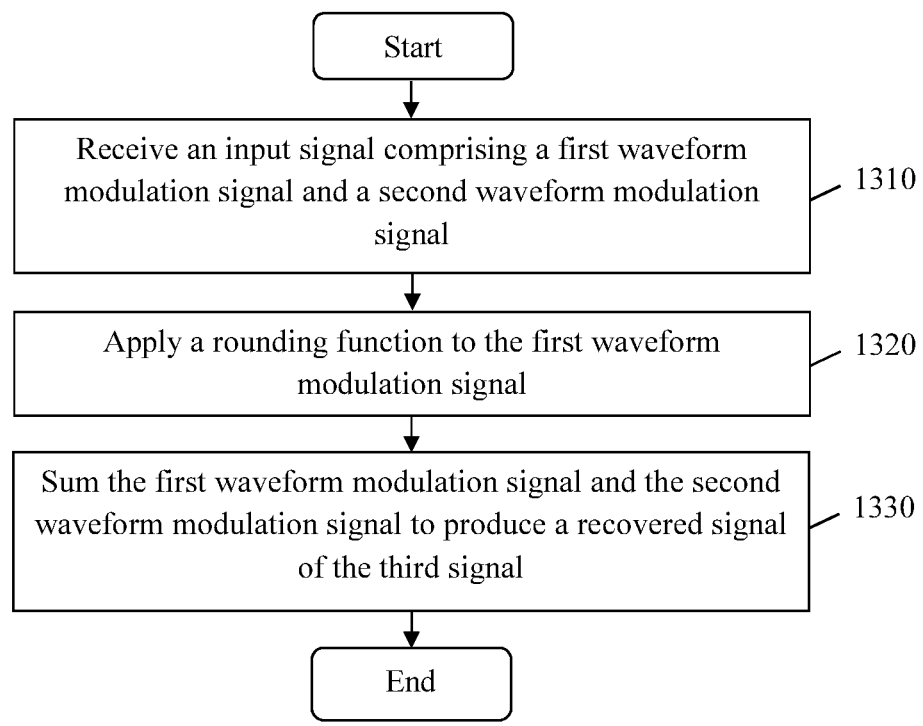
FIG. 13 is a flowchart of a method of performing CWM-based demodulation according to an embodiment of the disclosure.

FIG. 13 is a flowchart of a method 1300 of performing CWM-based demodulation according to an embodiment of the disclosure. The method 1300 is implemented by a communication device such as the RRU 110, BBUs 121, the receiver 500, and the CWM-CS demodulator 621. The method 1300 employs similar mechanism as the receiver 500. The method 1300 is implemented when receiving a CWM modulated signal. At step 1310, an input signal comprising a first waveform modulation signal and a second waveform modulation signal is received. The input signal is a CWM modulated signal, for example, transmitted by the transmitter 400. At step 1320, a rounding function is applied to the first waveform modulation signal to recover the original transmitted first waveform modulation signal. At step 1330, the first waveform modulation signal and the second waveform modulation signal are summed to produce a recovered signal of the third signal.

In an embodiment, a communication device includes means for generating a first waveform modulation signal, denoted as $W_1$, based on a first approximation of an input signal, denoted as S, means for generating a second waveform modulation signal, denoted as $W_2$, based on a first difference between the input signal S and the first waveform modulation signal $W_1$, means for generating a control signal, denoted as CS, having a sequence of control symbols with a pre-determined modulation format, means for performing TDM on the first waveform modulation signal $W_1$, the second waveform modulation signal $W_2$, and the control signal CS to form a CWM-CS, means for modulating the CWM-CS onto a carrier, and means for transmitting the CWM-CS over a communication link to a corresponding communication device in a network.

In an embodiment, a communication device includes means for receiving a CWM-CS, means for performing time-domain demultiplexing on the CWM-CS to obtain a first waveform modulation signal, denoted as $W_1$, a second waveform modulation signal, denoted as $W_2$, and a control signal, denoted as CS, means for training a channel equalizer based on the control signal CS, means for performing channel equalization on the first waveform modulation signal $W_1$, the second waveform modulation signal $W_2$, and a control signal CS, means for performing time-domain demultiplexing on the first waveform modulation signal $W_1$, the second waveform modulation signal $W_2$, and a control signal CS, means for applying a rounding function to the first waveform modulation signal $W_1$, means for generating a recovered signal, denoted as S, by summing the first waveform modulation signal $W_1$ and the second waveform modulation signal $W_2$, means for recovering data from the recovered signal S, and means for recovering control information by demodulating the control signal CS.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented in a communication device, comprising:
    generating, via a processor of the communication device, a first waveform modulation signal, denoted as $W_1$, based on a first approximation of an input signal, denoted as S;
    generating, via the processor, a second waveform modulation signal, denoted as $W_2$, based on a first difference between the input signal S and the first waveform modulation signal $W_1$;
    generating, via the processor, a control signal, denoted as CS, having a sequence of control symbols with a pre-determined modulation format;
    performing, via the processor, time-domain multiplexing (TDM) on the first waveform modulation signal $W_1$, the second waveform modulation signal $W_2$, and the control signal CS to form a cascaded waveform modulation signal with embedded control signal (CWM-CS);
    modulating, via a frontend of the communication device, the CWM-CS onto a carrier; and
    transmitting, via the frontend, the CWM-CS over a communication link to a corresponding communication device in a network.

2. The method of claim 1, wherein generating the first waveform modulation signal $W_1$ comprises approximating the input signal S as follows:

$$W_1 = round\left(\frac{S}{E_{max}} \times M\right) \times \frac{E_{max}}{M},$$

where round( ) is a rounding function that rounds an input value to a nearest integer, $E_{max}$ is related to a maximal amplitude of the input signal S, and M is a positive integer.

3. The method of claim 2, wherein the input signal S is a complex-valued signal comprising a real component and an imaginary component, and wherein $E_{max}$ is associated with a first maximum value of the real component or a second maximum value of the imaginary component.

4. The method of claim 2, wherein M is between 4 and 8.

5. The method of claim 2, wherein the first waveform modulation signal $W_1$ is generated such that the first waveform modulation signal $W_1$ comprises $(2M+1)^2$ distinct complex signal values based on a signal-to-noise-ratio (SNR) of the communication link.

6. The method of claim 2, further comprising selecting, via the processor, a value for M based on a link signal-to-noise ratio (SNR) of the communication link.

7. The method of claim 1, wherein the input signal S comprises an in-phase (I) component and a quadrature-phase (Q) component, wherein the I component is represented by first N bits, denoted as $i_n$ for $1 \le n \le N$, as follows:

$$S_I = real(S) = a \sum_{n=1}^{N} 2^{n-1}\left(i_n - \frac{1}{2}\right),$$

and wherein the Q component is represented by second N bits, denoted as $q_n$ for $1 \le n \le N$, as follows:

$$S_Q = imag(S) = b \sum_{n=1}^{N} 2^{n-1}\left(q_n - \frac{1}{2}\right)$$

where real(S) represents a real component of the input signal S, imag(S) represents an imaginary component of the input signal S, and a and b are two quantities related to sampling resolutions of the I component and the Q component, respectively.

8. The method of claim 7, wherein the input signal S comprises a digital representation of a common public ratio interface (CPRI) signal.

9. The method of claim 7, wherein generating the first waveform modulation signal $W_1$ comprises obtaining m most significant bits (MSBs) for each of the I component and the Q component as follows:

$$W_1 = a \sum_{n=N-m+1}^{N} 2^{n-1}\left(i_n - \frac{1}{2}\right) + jb \sum_{n=N-m+1}^{N} 2^{n-1}\left(q_n - \frac{1}{2}\right)$$

where j is an imaginary unit.

10. The method of claim 1, wherein the pre-determined modulation format is a quadrature-amplitude modulation (QAM) format.

11. The method of claim 10, further comprising selecting 16-quadrature-amplitude modulation (16-QAM) as the QAM format when a signal-to-noise-ratio (SNR) of the control signal CS is between 23 decibel (dB) to 29 dB.

12. The method of claim 10, further comprising selecting 64-quadrature-amplitude modulation (64-QAM) as the QAM format when a signal-to-noise-ratio (SNR) of the control signal CS is greater than 29 decibel (dB).

13. The method of claim 1, further comprising:
scaling, via the processor, the first waveform modulation signal $W_1$ by a first factor $c_1$ prior to performing the TDM;
scaling, via the processor, the second waveform modulation signal $W_2$ by a second factor $c_2$ prior to performing the TDM;
scaling, via the processor, the control signal by a third factor $c_3$ prior to performing the TDM; and
selecting, via the processor, the first factor $c_1$, the second factor $c_2$, and the third factor $c_3$ such that maximal amplitudes of $c_1 \times W_1$, $c_2 \times W_2$, and $c_3 \times CS$ are similar.

14. The method of claim 1, wherein the input signal S comprises an orthogonal frequency-division multiplexing (OFDM) signal, a filtered OFDM signal, a multi-band OFDM signal, a discrete Fourier transform (DFT)-spread OFDM signal, a filter-band multi-carrier (FBMC) signal, a universal filtered multi-carrier (UFMC) signal, or combinations thereof.

15. The method of claim 1, further comprising performing upsampling on the CWM-CS prior to modulating the CWM-CS.

16. The method of claim 1, further comprising performing pulse shaping (PS) on the CWM-CS prior to modulating the CWM-CS.

17. The method of claim 1, further comprising performing frequency up-conversion on the CWM-CS to produce a frequency up-converted CWM-CS prior to modulating the CWM-CS.

18. The method of claim 17, wherein modulating the CWM-CS comprises modulating a real component of the frequency up-converted CWM-CS.

19. The method of claim 18, wherein the real component of the frequency up-converted CWM-CS is modulated via an optical intensity modulation (IM) with a suitable bias.

20. The method of claim 1, wherein the control signal CS comprises control words for network control and management purpose.

21. The method of claim 1, wherein the control signal CS comprises training symbols for channel synchronization purpose.

22. The method of claim 1, further comprising:
generating the second waveform modulation signal $W_2$ further by applying a second approximation to the first difference between the input signal S and the first waveform modulation signal $W_1$;
generating a third waveform modulation signal, denoted as $W_3$, based on a second difference between the input signal S and a sum of the first waveform modulation signal $W_1$ and the second waveform modulation signal $W_2$; and
performing the TDM further on the CWM-CS and the third waveform modulation signal $W_3$.

23. The method of claim 1, wherein the communication link comprises an optical fiber link, a cable link, a digital subscriber line (DSL) link, or a free-space microwave link.

24. A communication device comprising:
a processor configured to:
generate a first waveform modulation signal, denoted as $W_1$, based on a first approximation of an input signal, denoted as S;
generate a second waveform modulation signal, denoted as $W_2$ based on a difference between the input signal S and the first waveform modulation signal $W_1$;
perform time-domain multiplexing (TDM) on the first waveform modulation signal $W_1$ and the second waveform modulation signal $W_2$ to form a cascaded waveform modulation (CWM) signal; and
generate an output signal according to the first waveform modulation signal $W_1$ and the second waveform modulation signal $W_2$; and
a frontend coupled to the processor and configured to transmit the output signal over a communication link to a corresponding communication device in a network.

25. The communication device of claim 24, wherein the processor is further configured to generate the first waveform modulation signal by:
dividing the input signal by a first scale factor associated with a maximum signal amplitude of the input signal to produce a first signal;
multiplying the first signal by a second scale factor associated with a signal-to-noise-ratio (SNR) of the communication link;
applying a rounding function to the first signal;
multiplying the first signal by the first scale factor; and
dividing the first signal by the second scale factor.

26. The communication device of claim 25, wherein the processor is further configured to:
generate a control signal, denoted as CS, comprising a sequence of control symbols of a modulation format;
perform the TDM further on the control signal to form the CWM signal with embedded control signal (CWM-CS); and
scale signal levels of the first waveform modulation signal $W_1$, the second waveform modulation signal $W_2$, and the control signal CS such that maximal amplitudes of the first waveform modulation signal $W_1$, the second waveform modulation signal $W_2$, and the control signal CS are similar, and
wherein the frontend is further configured to modulate the output signal onto a carrier prior to transmitting the output signal.

* * * * *